(12) United States Patent
Maassarani

(10) Patent No.: US 8,469,452 B2
(45) Date of Patent: Jun. 25, 2013

(54) SEAT BACK HEADREST

(76) Inventor: Sami Maassarani, Birmingham, MI (US)

( * ) Notice: Subject to any disclaimer, the term of this patent is extended or adjusted under 35 U.S.C. 154(b) by 0 days.

(21) Appl. No.: 13/429,616

(22) Filed: Mar. 26, 2012

(65) Prior Publication Data

US 2012/0181835 A1    Jul. 19, 2012

Related U.S. Application Data

(60) Division of application No. 12/946,109, filed on Nov. 15, 2010, now Pat. No. 8,141,955, which is a division of application No. 13/009,938, filed on Jan. 20, 2011, which is a continuation-in-part of application No. 12/946,109, filed on Nov. 15, 2010, now Pat. No. 8,141,955.

(60) Provisional application No. 61/547,882, filed on Oct. 17, 2011.

(51) Int. Cl.
*A47C 7/38* (2006.01)

(52) U.S. Cl.
USPC .......................................................... 297/397

(58) Field of Classification Search
USPC .................................. 297/397, 391, 405, 408
See application file for complete search history.

(56) References Cited

U.S. PATENT DOCUMENTS

| | | | | |
|---|---|---|---|---|
| D201,492 S | * | 6/1965 | Jacobson | D6/601 |
| 4,205,878 A | * | 6/1980 | Wooten | 297/391 |
| 4,936,627 A | * | 6/1990 | Guim | 297/238 |
| D382,435 S | * | 8/1997 | Schaffner et al. | D6/601 |
| 6,139,100 A | * | 10/2000 | Baskin-Lockman et al. | 297/250.1 |
| 6,305,747 B1 | * | 10/2001 | Mei | 297/354.11 |
| D453,653 S | * | 2/2002 | Tunnell | D6/601 |
| 2002/0043831 A1 | * | 4/2002 | Alsup | 297/216.12 |

* cited by examiner

*Primary Examiner* — Milton Nelson, Jr.
(74) *Attorney, Agent, or Firm* — Young Basile Hanlon & MacFarlane Inc.

(57) ABSTRACT

A headrest includes at least one seat back mounting member and a connector coupling a cushion to the mounting member. A hinge may be coupled to the connector to movably deploy a cushion between a first use position for supporting a portion of a user's head and second substantially vertically extending non-use position. At least one or a pair of bores extends from the front surface into the seatback. The cushion connectors are removably mountable in the bores.

4 Claims, 25 Drawing Sheets

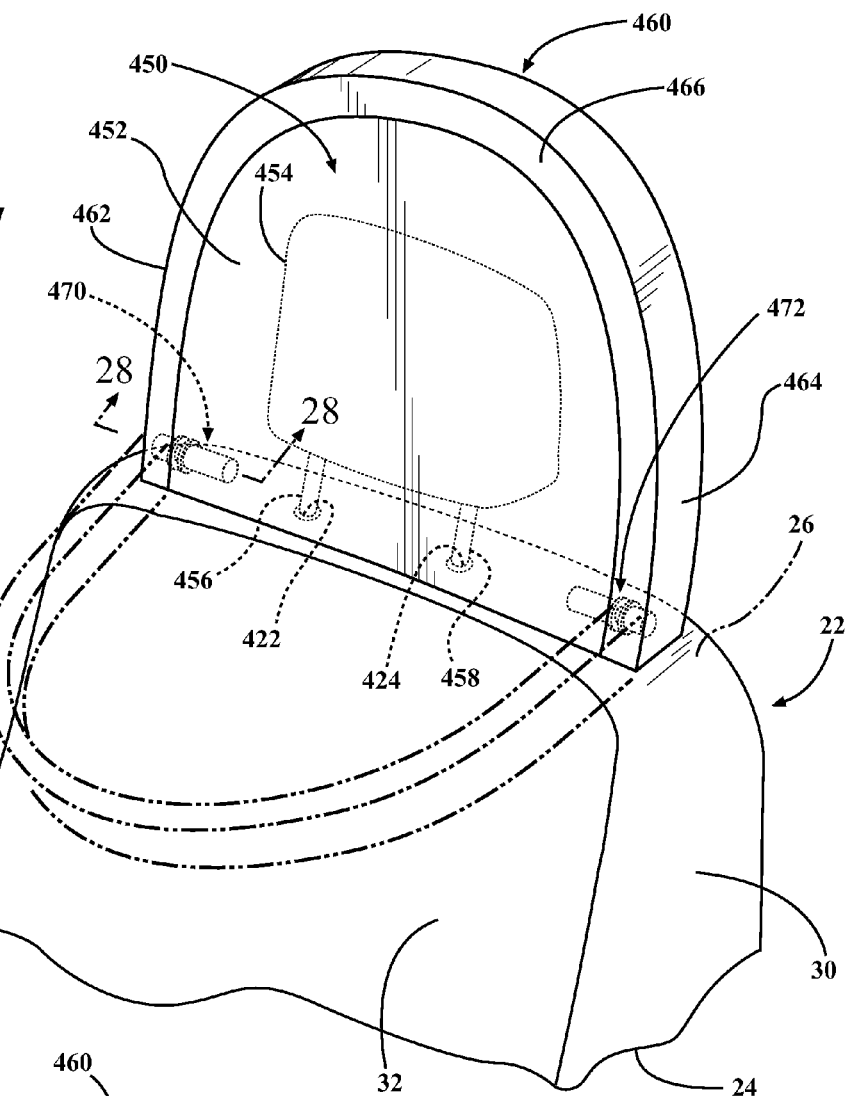
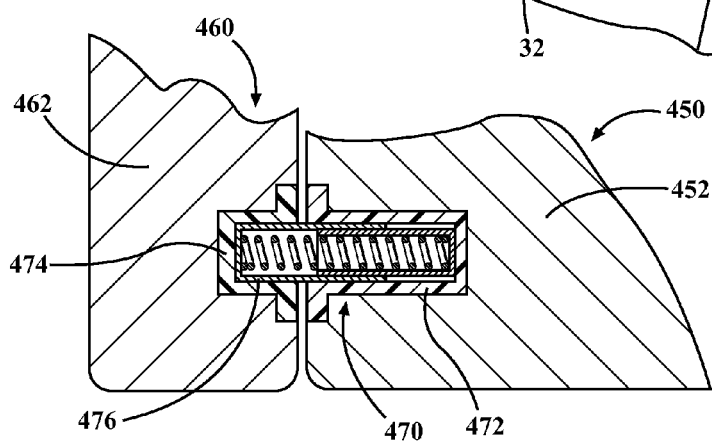

SEAT BACK HEADREST

CROSS REFERENCE TO CO-PENDING APPLICATIONS

This application is a division of co-pending U.S. patent application Ser. No. 12/946,109 filed Nov. 15, 2010, and co-pending U.S. patent application Ser. No. 13/009,938 filed Jan. 20, 2011, which is a continuation-in-part of co-pending U.S. patent application Ser. No. 12/946,109, and claims priority benefit of the filing date of U.S. provisional patent application Ser. No. 61/547,882 filed Oct. 27, 2011, all for a SEAT BACK HEADREST, by Sami Maassarani, the contents of each of which is incorporated herein by reference in its entirety.

BACKGROUND

In order to alleviate the neck strain associated with a person trying to sleep while seated in a seat, such as a vehicle seat, airplane seat, train seat, etc., and maintaining his or her head in a generally upright, vertical position, a variety of different headrests have been devised for supporting a portion of the user's head, such as each side cheek or in a fully face encircling manner.

Maintaining a sleeping person's head in a generally upright position while the person is sleeping in a seat is particularly important from a safety standpoint for small children who frequently fall asleep while riding in a vehicle, airplane, or train.

The various devised headrests are either designed as part of the vehicle head restraint or are portable and removably attachable to the seatback for deployment and use. However, the previously devised headrests are either cumbersome or unsightly to deploy and attach to a seat back or, do not have easily adjustable positions to enable use of the headrest with different sized individuals or with children as the children grow.

It would be desirable to provide a seat headrest which overcomes these difficulties and provides ease of attachment and ease of adjustability.

SUMMARY

A seat back headrest is mountable on a seat back for supporting a portion of a user's head when seated in the seat.

In one aspect, a combination of a vehicle seat and a headrest includes a vehicle seat having a generally upright seat back with an upper end, opposed side edges, a front surface and a back surface, and a headrest. At least one bore extending into the seat back from an open end at the front surface of the seat back, a portable headrest having a connector releasibly mountable in the bore in the seat back and a cushion carried by the connector for weight bearing support of a seat user's head.

In a modification of this aspect, the at least one bore includes two generally horizontally spaced bores formed in the seat back, each extending from an open end at the front surface of the seat back. Another connector removable in one of the bores in the seat back and a cushion carried by the connectors for weight bearing support of a seat user's head.

A separate cushion may be coupled to each connector. Alternately, a single cushion may be coupled to both connectors.

The connector may include a hinge having first and second pivotally connected hinge portions, the first hinge portion fixedly coupled to the connector; and the second hinge portion coupled to the cushion and pivotally movable from a first position relative to the first hinge member when the mounting member is in the first position on the seat back and a second position relative to the first hinge portion when the mounting member is in the inverted second position to deploy the cushion in one of two angular positions relative to the seat back.

BRIEF DESCRIPTION OF THE DRAWING

The various features, advantages and other use of the present seat back headrest become more apparent by referring to the following detailed description and drawing in which:

FIG. 27 is a perspective view of another aspect of a headrest integrally mounted on a seat head restraint;

FIG. 28 is a cross-sectional view generally taken along line 28-28 in FIG. 27;

DETAILED DESCRIPTION

Figure 1:
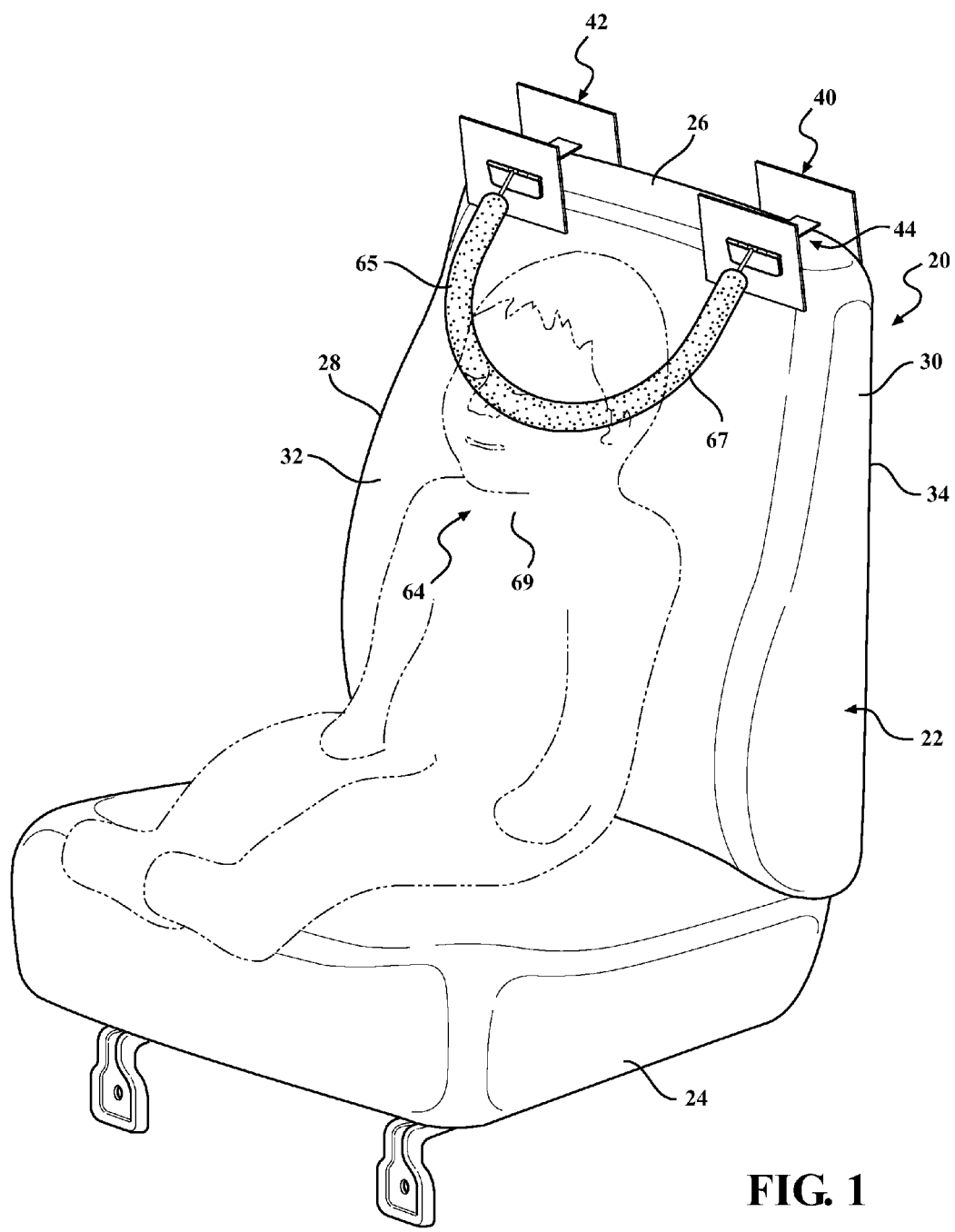
FIG. 1 is a perspective view of one aspect of a seat back head rest.

Referring now to the drawing and to FIG. 1 in particular, there is depicted one aspect of a headrest usable on a seat 20. By way of example only, the seat 20 may be any type of seat, such as vehicle seat, an airplane seat, a train seat or a seat used in an office, work space or home. The seat 20 has a seat back 22 and a seat bottom 24. Depending upon the application, the seat back 22 may be rigidly fixed to the seat bottom 24 or may be pivotal from in a more generally upright position shown in FIG. 1 to an angled position over the seat bottom 24.

For purposes of the following description, the seat back 22 includes a top edge 26, opposed side edges 28 and 30, a front surface 32 and an opposed rear surface 34.

One aspect of a headrest 40 is shown in FIGS. 1-5. The headrest 40 is designed as a portable headrest for removable mounting over the top edge 26 of the seat back 22. The headrest 40 includes one or a pair of mounting members 42 and 44. The mounting members 42 and 44 are configured for releasable mounting over the top edge 26 of the seat back 22 and are in substantial contact with the front surface 32 and the rear surface 34 of the seat back 22.

By way of example only, each mounting member 42 and 44 is identically constructed of a front seat engagement member 46 in a form of a planar plate and a like rear seat engagement member 48, also in the form of an enlarged planar plate. The large surface area of the front and rear plates 46 and 48 provides a secure mounting for the headrest 40 on the seat back 22.

A strap 50 is fixed to and interconnects the front and rear plates 46 and 48. The strap 50 may be a single strip of plastic or metal material which is integrally formed with or attached to the front and rear plates 46 and 48.

Alternately, the strap 50 may be formed of two members, one attached to each of the front and rear plates 46 and 48 and telescopingly engaged in a tight friction fit. This enables the strap 50 to be telescopingly elongated or reduced in length so as to vary the spacing between the front and rear plates 46 and 48 to enable the mounting members 42 or 44 to be securely affixed to any thickness of the seatback 22.

For purposes of the following description of the use and operation of the headrest 40, in the first mounting or use position where the mounting members 42 and 44 are securely mounted over the top edge 26 of the seat back 24, the front member 46 has an upper edge 52 and a lower edge 54. Similarly, the rear plate or member 48 of each mounting member 42 and 44 has an upper edge 56 and a lower edge 58.

Figure 3:
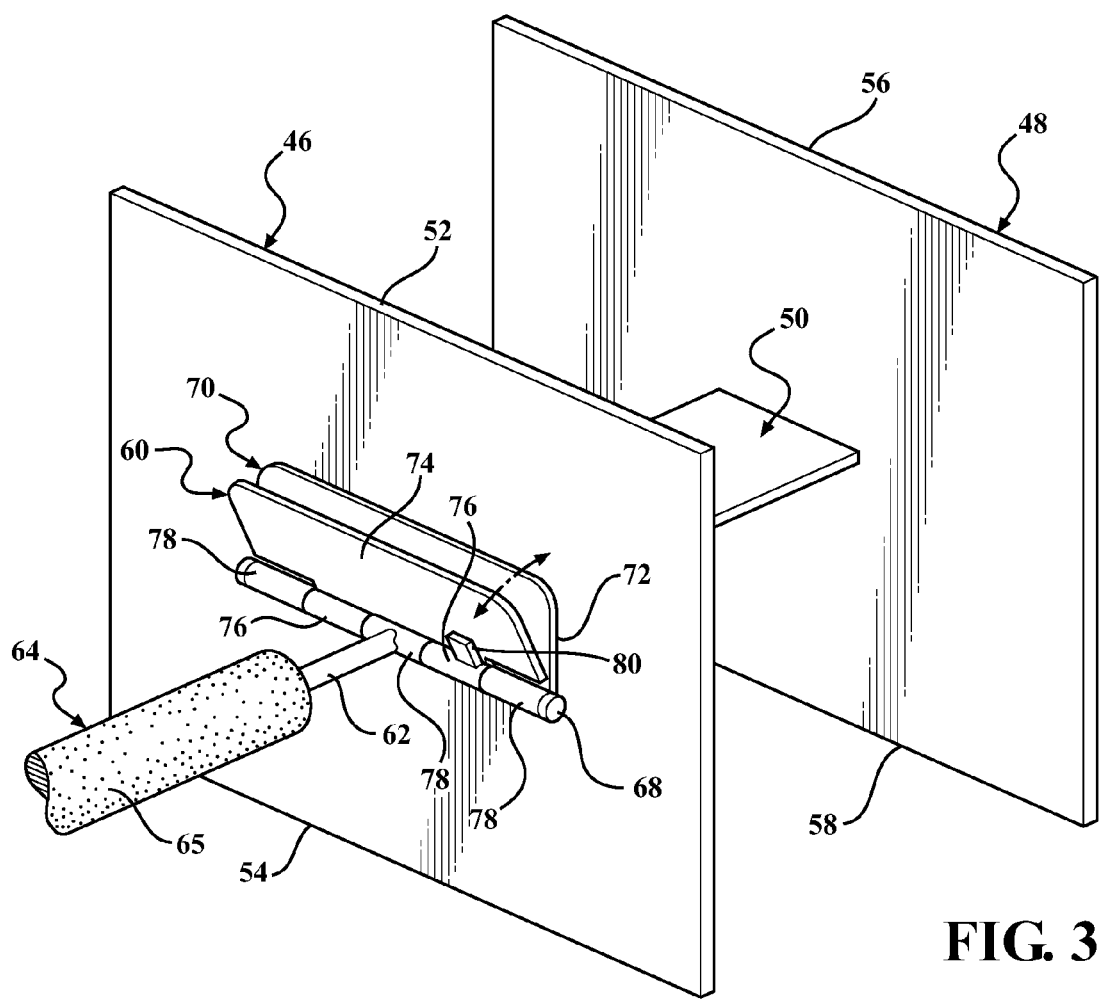
FIG. 3 is a further enlarged view of one portion of the headrest of claim 1 shown in an inverted position.
Figure 4:
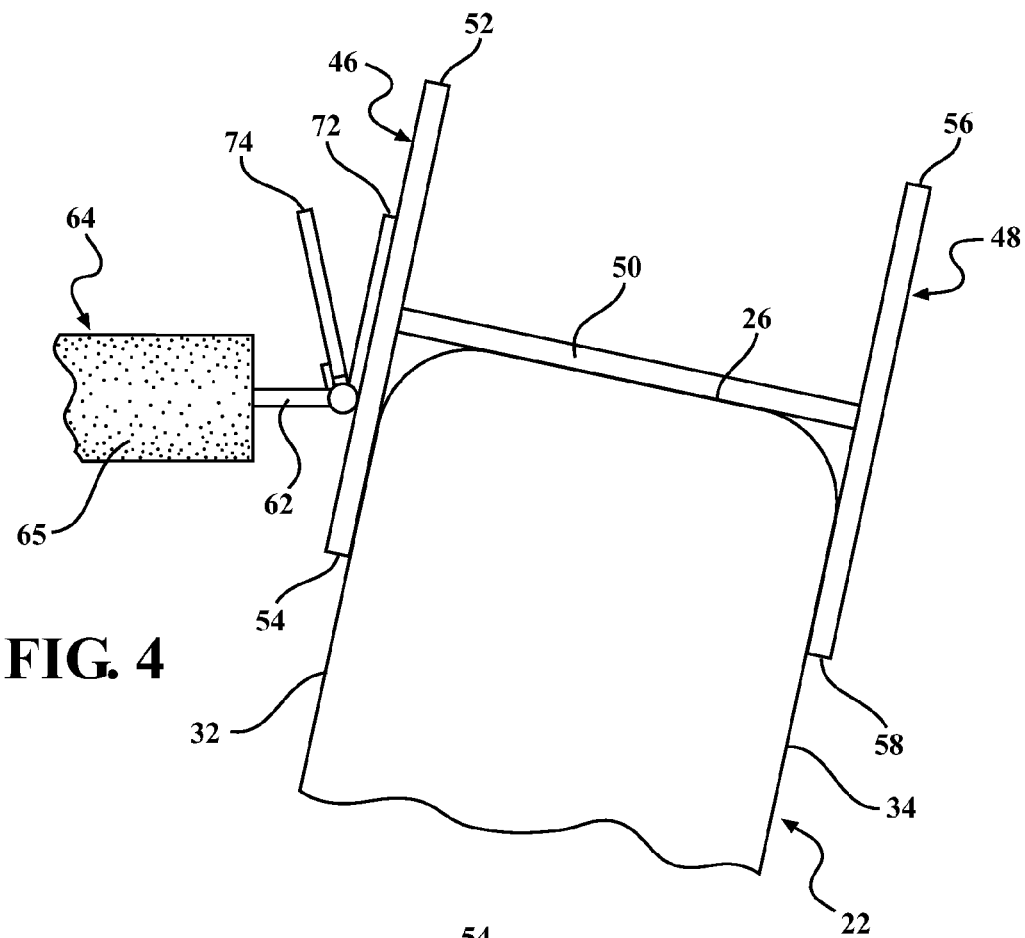
FIG. 4 is a side elevational view of one portion of the headrest shown in FIG. 1 deployed in a first employed position.
Figure 5:
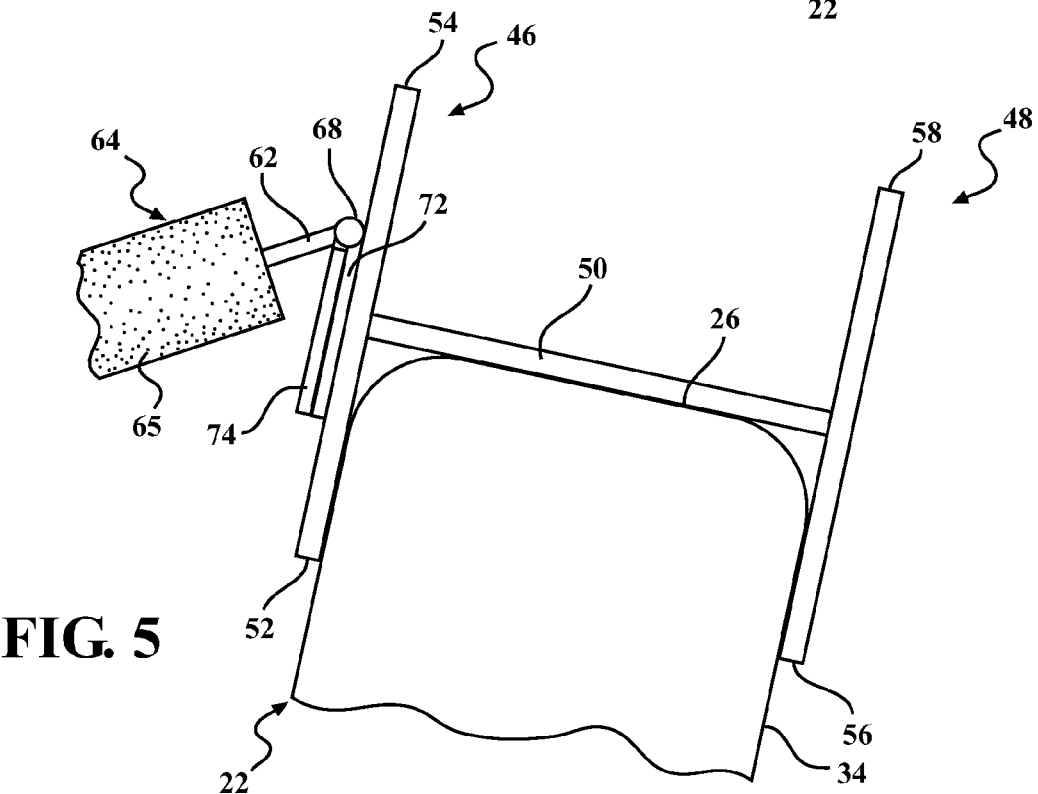
FIG. 5 is a side elevational view of one portion of the headrest shown in FIG. 1 deployed in a second employed position.

As shown more clearly in FIGS. 3-5, the upper edges 52 and 56 of the front and rear plates 46 and 48 extend above the strap 50 on the top edge 26 of the seat back 22. In the illustrated mounting position, shown in FIG. 4, the lower edges 54 and 58 of the front and rear plates 46 and 48 extend below the top edge 26 of the seat back 22.

A cushion connector 60 is affixed to the front plate 46 of each mounting member 42 and 44. In one aspect, the cushion connector 60 includes a wire rod 62, formed of plastic, metal, etc., which extends into or is otherwise affixed to one end of a cushion 64.

A hinge 70 is formed as part of the cushion connector 60. The hinge 70 includes first and second hinge portions or leaves 72 and 74. The first hinge portion or leaf 72 is fixedly attached by adhesive, integral molding fasteners to the front plate 46, etc. It will be understood that the first hinge leaf 72 may also constitute part of the front plate 46 itself. As is conventional, the first hinge leaf 72 includes a plurality of cylindrical, hollow spaced sleeves 76 adapted for receiving a hinge pin 68.

The second hinge leaf 74 also includes a plurality of cylindrical sleeves 78 which are linearly spaced apart and intermeshed with the sleeves 76 on the first hinge leaf 72 for receiving the pivot pin 68 therethrough and forming a pivot axis which extends in a substantially horizontal orientation when the headrest 40 is mounted over the top edge 26 of the seat back 22.

In this aspect, as shown in FIG. 3, the rod 62 is fixedly attached to one of the cylindrical sleeves 78 on the second hinge leaf 74, such as the central most sleeve 78. This causes the rod 62 to pivot with movement of the second hinge leaf 74 as described hereafter.

A stop 80, shown in FIG. 3, is fixed at one end to the second hinge leaf 74 and extends to an opposite free end adapted to abut one of the cylindrical sleeves 76 on the first hinge leaf 72 to limit the open pivotal movement of the second hinge leaf 74 with respect to the first hinge leaf 72 to a predetermined angle as shown in FIG. 3.

FIG. 3 depicts a first mounting position of the headrest 40 on the seat back 22. In this position of the headrest 40, the second hinge leaf 74 will pivot by gravity and the weight of the cushion 64 to the angularly open position angularly spaced from the first hinge leaf 72. This causes the rod 62 to orient the cushion 64 in a substantially horizontal position as shown in FIGS. 1 and 4 with respect to the seat back 22 and the seat bottom 24. This position of the cushion 64 would be suitable for adults or older children.

Figure 2:
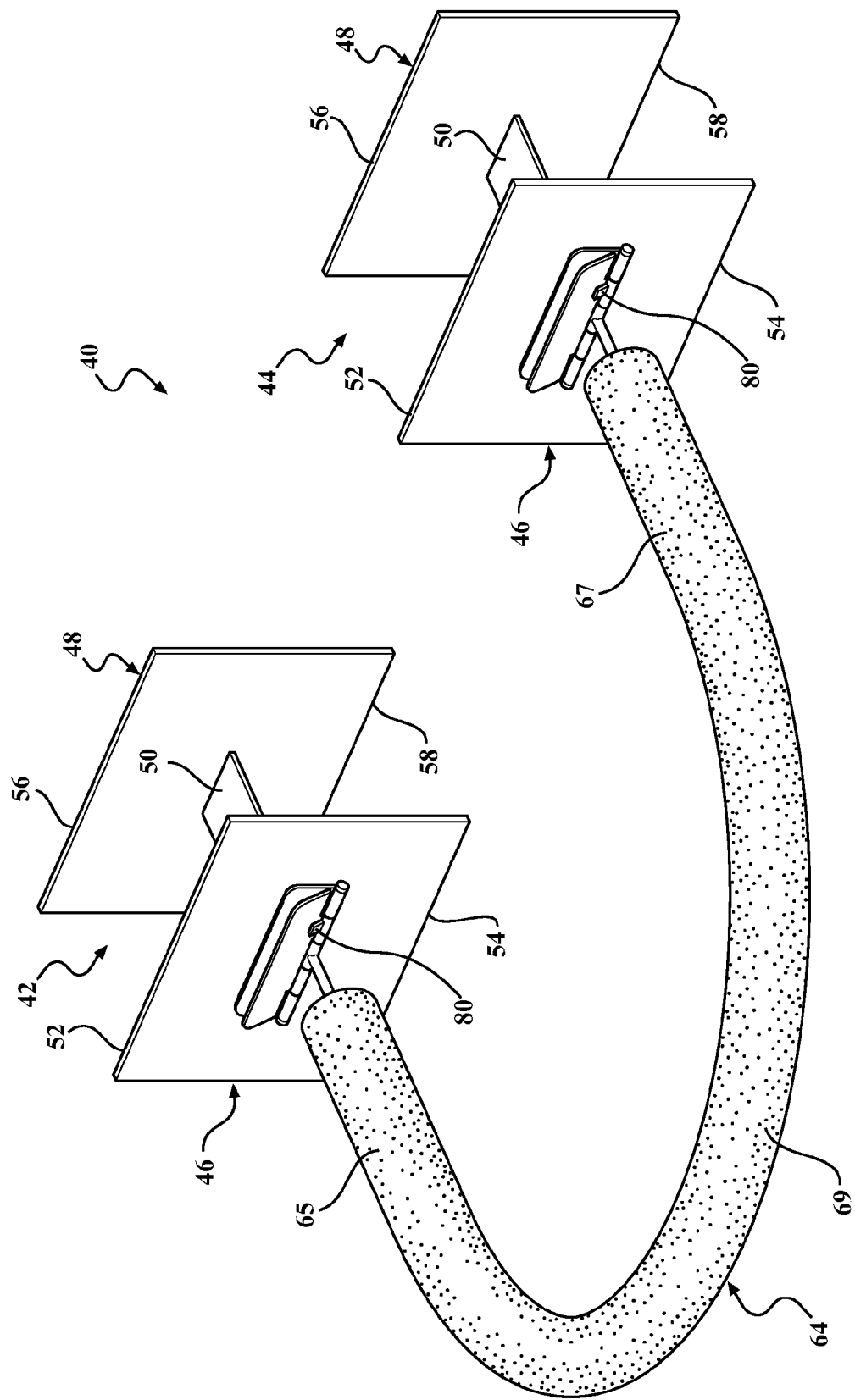
FIG. 2 is an enlarged perspective view of the head rest shown in FIG. 1.

For smaller height individuals, such as children the headrest 40 can be inverted 180° from the mounting position shown in FIGS. 1 and 2 by flipping the mounting members 42 and 44 end over end until the mounting member 44 is in the prior position of the mounting member 42 on the seat back 22 as shown in FIG. 5. When the mounting members 42 and 44 are reengaged with the top edge 26 of the seat back 22, the weight of the cushion 64 will cause a second hinge leaf 74 to pivot about the pivot pin 68 until it is disposed in close abutment or engagement with the first hinge leaf 72. This collapsing movement of the hinge 70 causes the rod 62 and the cushions 64 to pivot in a downward direction relative to the seat back 22 to a smaller acute angle with respect to the seat back 22. This lowers the sides and front of the portions of the cushion 64 for shorter height individuals.

The rod 156 is formed as a continuous member with freely movable second end portions 159 and 161 which are formed with interconnecting means 162 and 164 in the form of interlocking hooks or loops. This arrangement allows the enlarged pads 158 and 160 to be engaged with the front surface 32 of the seat back 22 and then the free ends 159 and 160 of the rod 156 looped around the head restraint or upper portion of the seat back 22 and interlocked to secure the headrest 142 on the seat 20.

If the rod 152 if formed of a flexible material, such a flexible metal, not only can the angle of the end of the end portions 146 of the rod 156 be changed to vary the angle of the cushion 152 relative to the seat back 22, but the free end portions 159 and 160 of the rod 156 may also be bent to any desired shape to fit the headrest 142 securely about the upper portion of any size or shape seat back 22.

Alternately, the cushion 90 and 92 may have generally planar or slightly curved side members, without a central portion, so as to be capable of supporting only the sides of a user's head.

The cushions 64, 90, or 92 may be formed in any conventional manner, depending upon the construction and use of the seat. Foam or other soft, compliant materials may be used for the entire cushion or an internal core of the cushion. Decorative outer covers, formed of leather, plastic, fabric, and complimentary to materials used in conventional vehicle, airplane, train or home seats, maybe employed.

Figure 7A:
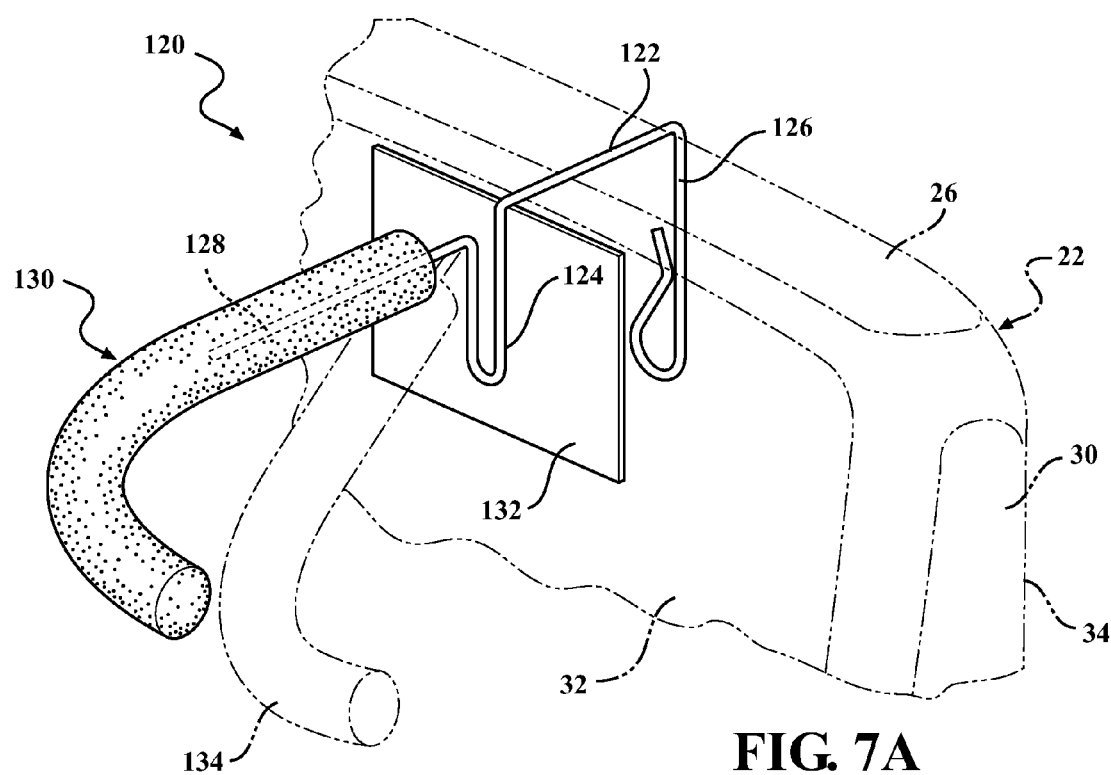
FIG. 7A is a perspective view of another aspect of a headrest.

Referring now to FIG. 7A, there is depicted another aspect of a headrest 120. In this aspect, the mounting member and the cushion connector are formed of a single pre-shaped or bent rod 122. The rod 122 can be made of any suitable material, such as moldable plastic as well as plastic covered metal, etc. The rod 122 is bent or pre-shaped into a mounting portion including first and second mounting legs 124 and 126 configured to respectively engage the front surface 32 and the rear surface 34 of the seat back 22. Each mounting leg 124 and 126 is formed of two adjacent bent portions of the rod 122 for stability and adjustability. An end portion 128 of the rod 122 is disposed within a cushion 130 for supporting the cushion 130 on the mounting rod 122.

As in previous aspects of the present headrest, the cushion 130 may take a variety of shapes, including straight, slightly curved, or the J-shape shown by way of example in FIG. 7A.

An enlarged pad or plate 132 is fixed to the front mounting leg 124 to provide an enlarged surface area for securely supporting the headrest 122 on the seat back 22. Depending on the materials used to form the rod 122 and the pad 132, welding, adhesive, fasteners, or other joining techniques may be employed to fixedly join the pad 132 to the front mounting leg 124.

Where the rod 122 is made of a flexible metal, the front end portion 124 of the rod 120 due to angled, two part form of the front mounting leg 122 maybe easily bent in a downward position to lower the angle of the cushion 130 relative to the seat back 22 as by reference number 24 shown in phantom in FIG. 7A. This enables the position if the cushion 130 to be adjusted to suit the height of the user of the seat.

Figure 7B:
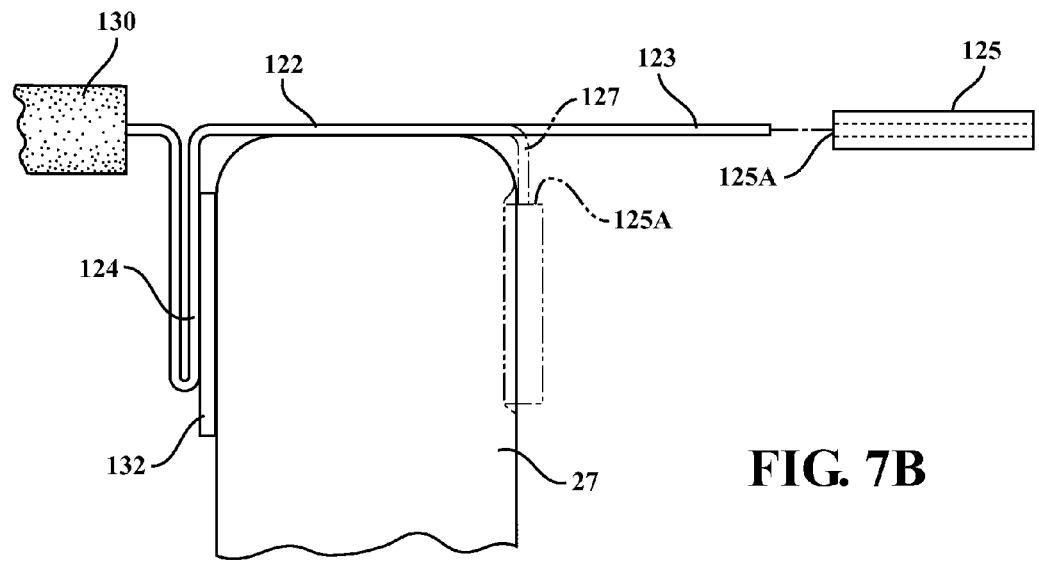
FIG. 7B is a side elevational view of a modification to the headrest shown in FIG. 7A.

Another aspect of the wire connector 122 is shown in FIG. 7B. In this aspect of the headrest, the second leg 126 shown in FIG. 7A is replaced by an initially shaped straight portion with the connector portion 122. A form 125 having an internal bore size to slidably fit the form over the end of 123 of the rod 122 is provided with an edge 125A.

In use, with the end portion 123 of the rod 122 extending perpendicularly away from the rear surface of the seat back 27, which has a smaller thickness than the seat back 22 shown in FIG. 7A, the form 125 is slid over the end portion 123 of the rod 122 until the end 125A of the form 125 abuts the rear edge of the seat back 27. The form 125 is then used to bend the free end 123 of the rod 122 in a downward position until the form and/or the free end 123 of the rod 122 is bent at a downward extending angle relative to the connector portion of the rod 122 a lane over the top edge of the seat back 27 to snugly conform the rod 122 to the shape and thickness of the seat back 127.

Figure 7C:
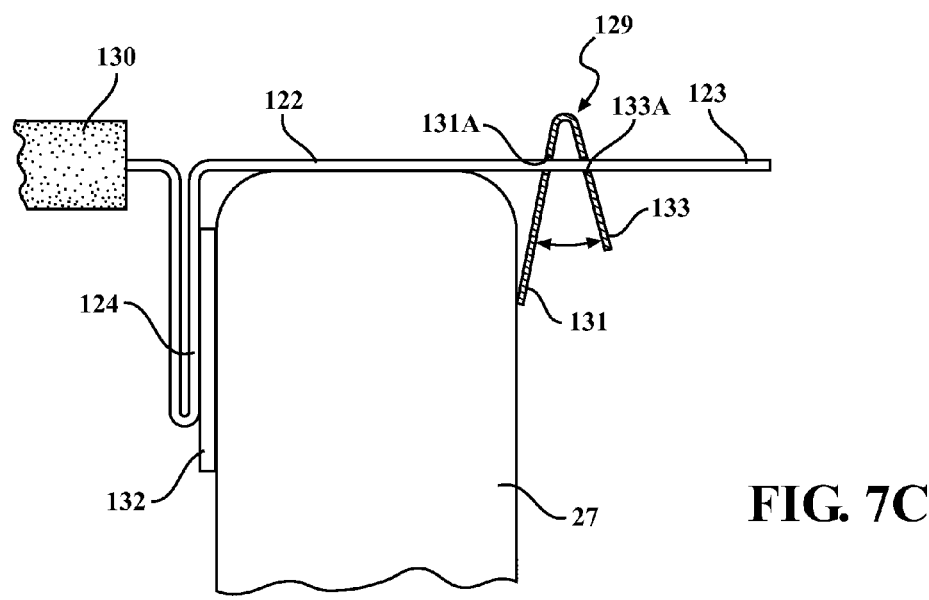
FIG. 7C is a side elevational view of another medication to the headrest shown in FIG. 7A.

Another modification to the wire connector 122 is shown in FIG. 7C. In this aspect of the headrest, the rod 122 also has the straight rearward extending portion 123. Rather than bending the rod 122 around the top edge of the seat back 27, a clip 129 is provided. The clip 129 is formed of a spring material, such as a spring steel or plastic and has a V-shape formed with first and second angularly disposed legs 131 and 132. Coaxially aligned apertures 131A and 133A are respectively formed in the legs 131 and 133 and are sized to fit over the free end 123 of the rod 122.

In use, after the rod 122 is mounted over the top edge of the seat back 127, the apertures 131A and 133 of the clip 129 are slid over the free end of the rod 122 by bending the legs 131 and 133 of the clip 129 together. This coaxially aligns the apertures 131A and 133A to allow easy sliding insertion of the clip 129 over the free end 123 of the rod 122. The clip 129 is slid along the length of the free end 123 until the leg 131 contacts the rear surface of the seat back 27. The force holding the end of the legs 131 and 133 is then released which the causes the legs 131 and 133 to spring outward to the position shown in FIG. 7C. This moves the apertures 131A and 133A out of coaxially alignment and brings edges of the legs 131 and 133 surrounding the apertures 131A and 133A into friction contact with the end portion 123 of the rod 122 to forcibly hold the clip 129 on the rod and thereby the entire mounting member and cushion 130 on the seat back 27.

This arrangement allows easy adaptability of the mounting member to any thickness seat back. The free end 123 extending rearward of the clip 129 can be covered a cushion, such as the form 125 shown in FIG. 7B. Alternately, user of the mounting member with the clip 129 can be reserved for seat backs in the rear seat of a vehicle, such as the rear most seat of a mini van or SUV or the rear seat of a vehicle having only front and rear seats.

Figure 8:
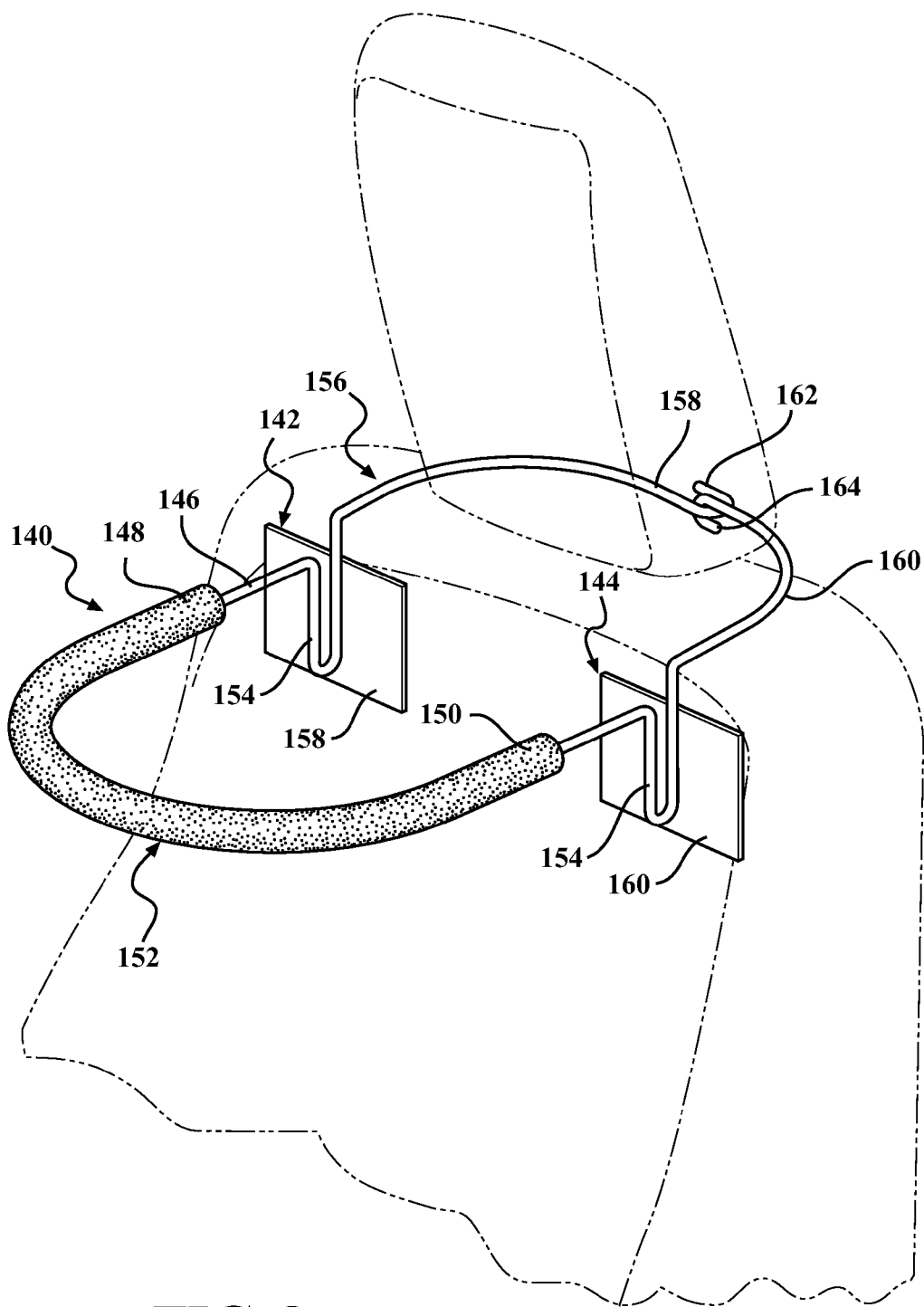
FIG. 8 is a perspective view of another aspect of a headrest.

FIG. 8 depicts another aspect of a headrest 140 which can be considered a modification of the aspect shown in FIG. 7A. The headrest 140 shown in FIG. 8 includes a first seat mount member 142 and a second seat mount member 144. The seat mount members 142 and 144 are substantially identical in that each includes an end portion 146 engagable with one end 148 or 150 of a cushion 152 and a mounting leg portion 154 formed of a U-shaped bend in a rod 156. An enlarged pad 158 and 160 is coupled to the mounting leg 154 in each mounting member 142 and 144 for engagement with the front surface 32 of a seat back 22.

The rod 156 is formed as a continuous member with freely movable second end portions 159 and 161 which are formed with interconnecting means 162 and 164 in the form of interlocking hooks or loops. This arrangement allows the enlarged pads 158 and 160 to be engaged with the front surface 32 of the seat back 22 and then the free ends 159 and 160 of the rod 156 looped around the head restraint or upper portion of the seat back 22 and interlocked to secure the headrest 142 on the seat 20.

If the rod 152 is formed of a flexible material, such as a flexible metal, not only can the angle of the end portions 146 of the rod 156 be changed to vary the angle of the cushion 152 relative to the seat back 22, but the free end portions 159 and 161 of the rod 156 may also be bent to any desired shape to fit the headrest 142 securely about the upper portion of any size or shape seat back 22.

Figure 9:
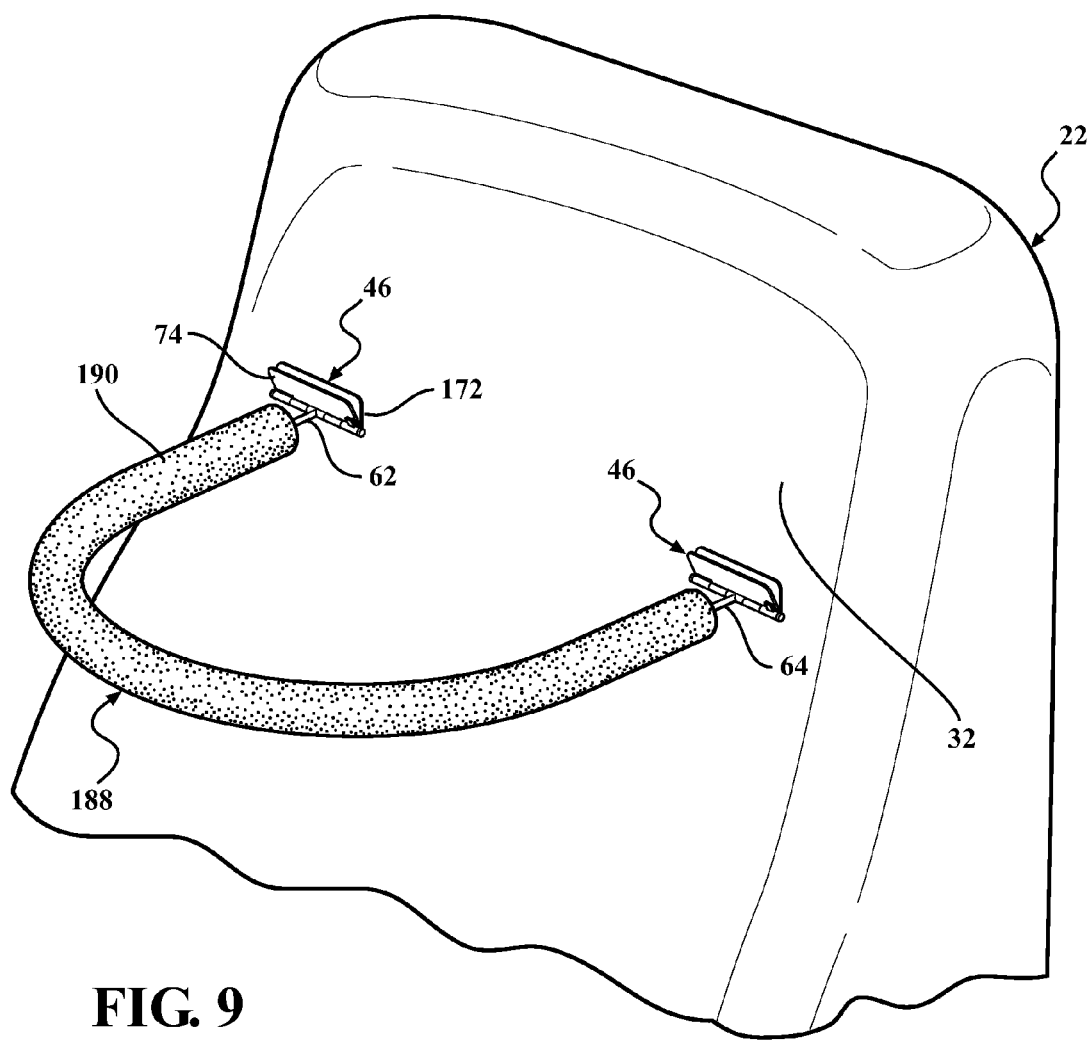
FIG. 9 is a perspective view of another aspect of a headrest.
Figure 10:
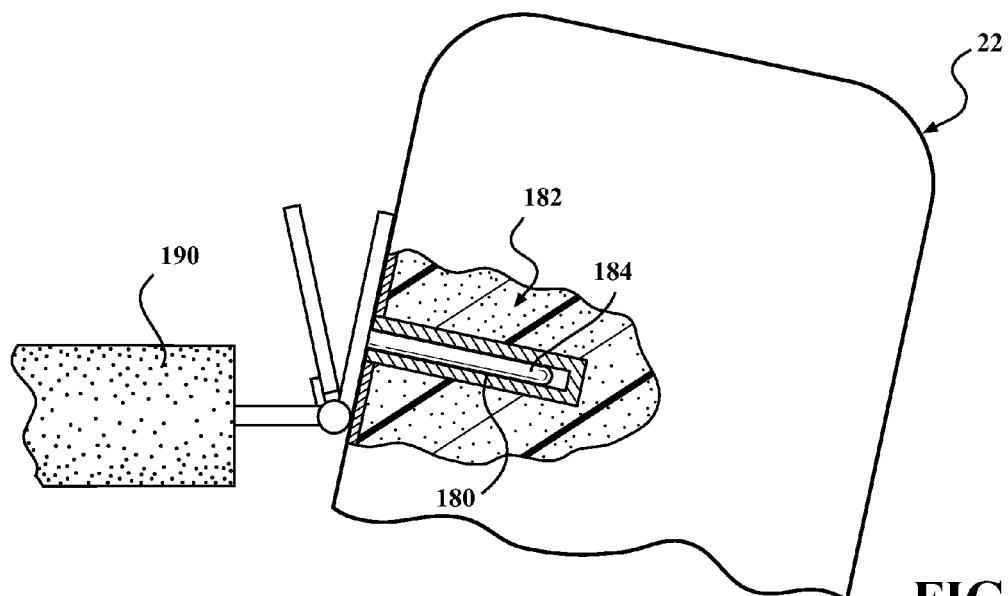
FIG. 10 is a side elevational view of a headrest shown in FIG. 9 depicted in a first deployed position.
Figure 11:
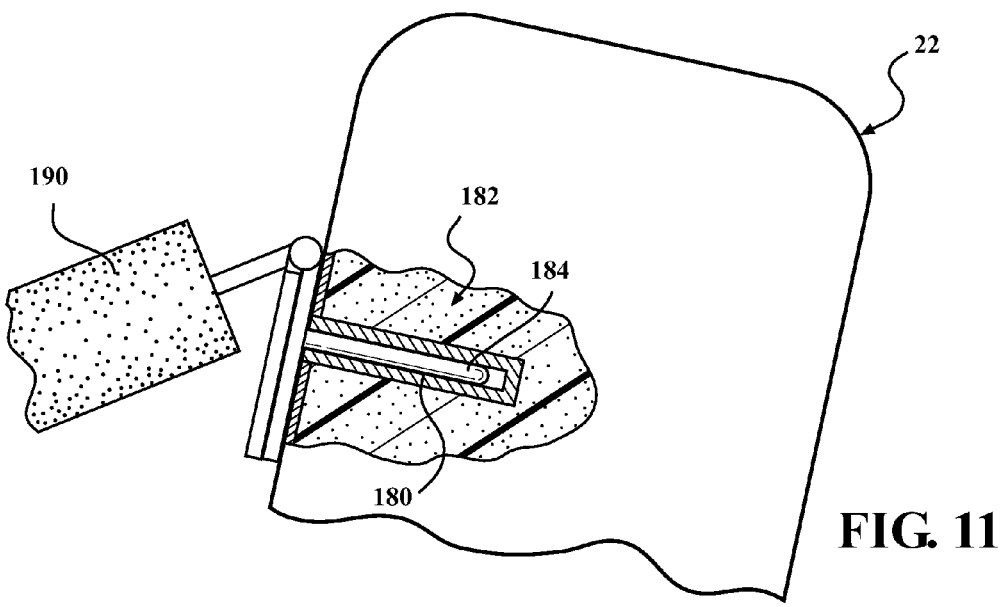
FIG. 11 is a side elevational view of a headrest shown in FIG. 9 depicted in a second deployed position.

Another aspect of a headrest is shown in FIGS. 9-11 in which the headrest is integrally coupled to the seat back 22.

In this aspect, the seat back 22 is formed with a hollow bore 180 which maybe contained within a rigid cylinder 182 fixedly mounted in the upper portion of the seat back. The bore 180 in the cylinder 182 has an open end through the front surface 32 of the seat back 22.

The hinge members 46 and rods 62 and 64 of the headrest 40 shown in FIG. 2 are also employed in this aspect of the headrest. An additional rod 184 extends from a first hinge leaf 72 and is removably insertable into the bore 180 in the cylinder 182 mounted in the seat back 22. The rods 62 and 64 support a cushion 190. The cushion 190 is shown by example only as being a continuous semi-circular cushion extending between each of the rods 62 and 64. It will be understood that each rod 62 and 64 may support a separate cushion, such as the straight or J-shaped cushions shown in FIG. 6.

When the rods 184 coupled to the hinge members 46 are inserted into the bores 180 in the seat back 22 in a first orientation, shown in FIG. 10, the second hinge leaf 74 will pivot to an open position, angularly spaced from the first hinge leaf 72 to orient the cushion 190 in a substantially horizontal position relative to the seat back 22.

The rods 184 may be removed from the bores 180 in the seat back 22 and the entire head rest 188 inverted as shown in FIG. 11 before the rods 184 are reinserted into the bores 180 of the seat back 22. In this orientation, the second hinge leaf 74 pivots into close proximity to or in contact with the first hinge leaf 72 thereby dropping the cushion 190 to a smaller acute angle relative to the seat back 22 then when the mounting members are in the opposite position shown in FIG. 10.

Figure 12:
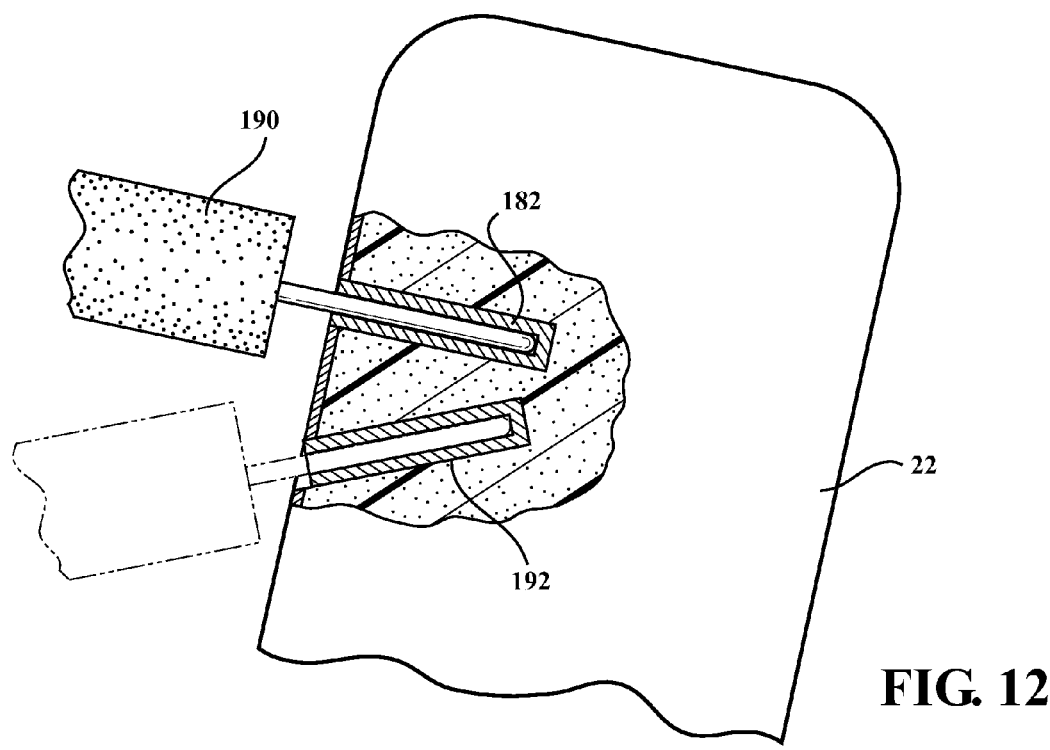
FIG. 12 is another aspect of a headrest.

The varying angular position of the cushion 190 may also be achieved by employing two pairs of cylindrical members 182 and 192, as shown in FIG. 12, on one side or both sides of the upper portion of the seat back 22. The second cylindrical sleeve 192 is angled at a more downward angle then the generally horizontally disposed sleeve 182. The rods 62, which do not have the hinge members 46, may then be simply inserted into the bores in either cylindrical sleeve 182 or 192 to place the cushion 190 at the desired one of two angular positions relative to the seat back 22 to accommodate the height and size of the user of the seat.

Figure 14:
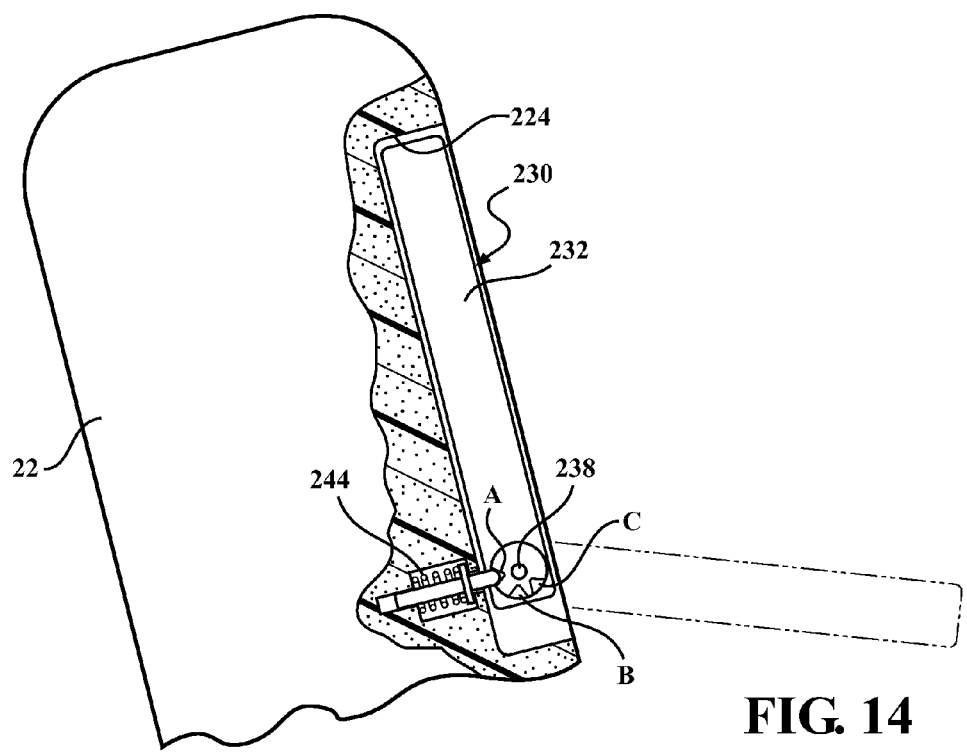
FIG. 14 is a cross-sectional view generally taken along lines 14-14 in FIG. 13.
Figure 13:
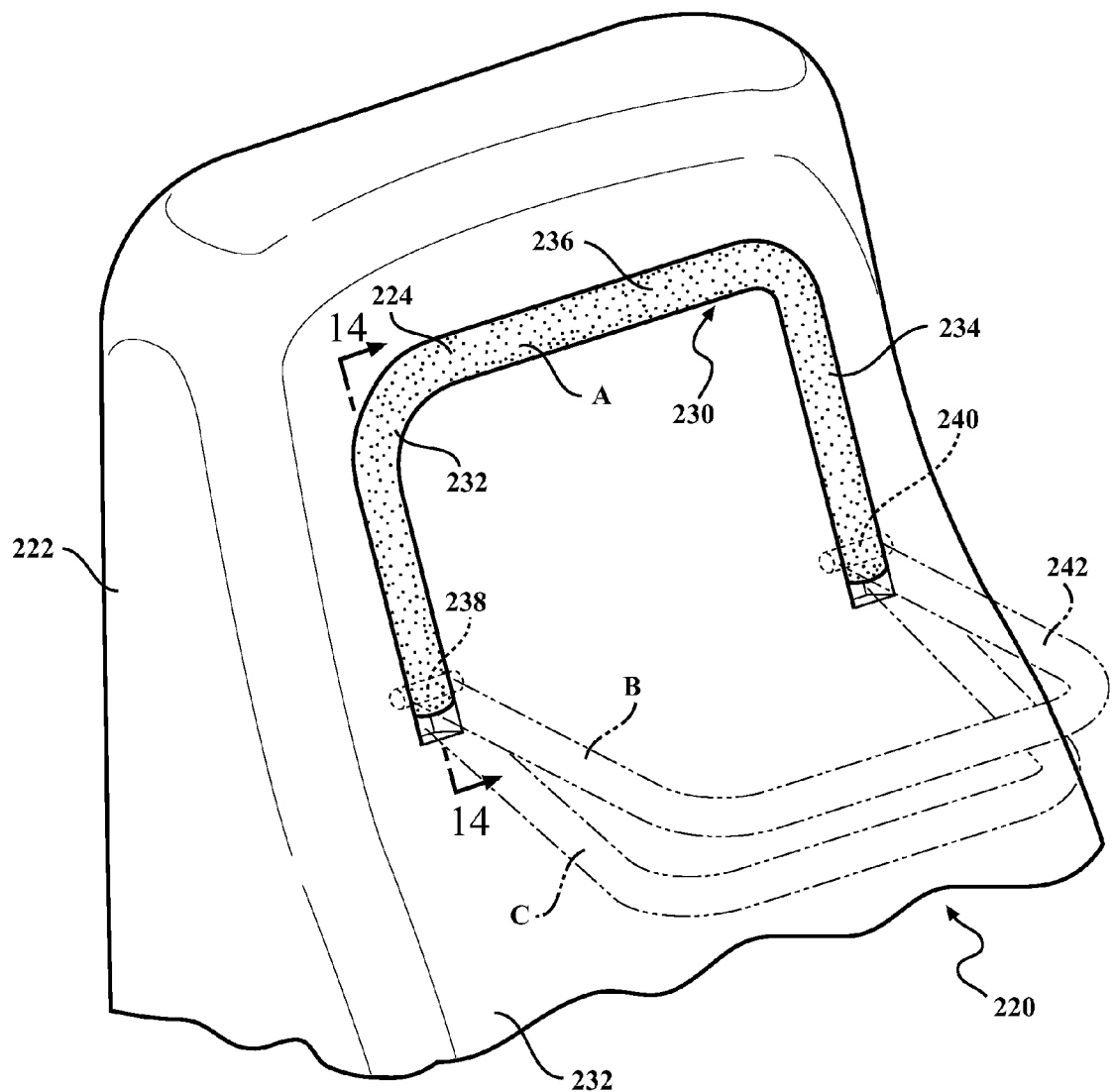
FIG. 13 is a perspective view of another aspect of a headrest.

Another aspect of a headrest is shown in FIGS. 13 and 14. In this aspect, a seat back 222 of a seat 220 has a recess 224 formed along the upper portion of the seat back 22 and extending inward into the seat back 222 from the front surface 232. The recess 224 may have an inverted U-shape to accommodate a continuous semicircular U-shaped cushion 230 shown by way of example in FIG. 13. In the case of only a single side cushion or a pair of separate side cushions which are independently movable relative to other, the recess 224 would have a shape complimentary to the shape of the cushions employed in the headrest.

The cushion 230 is formed with a pair of opposed side arms 232 and 234 which interconnected at one end by an end segment 236. A pivot pin 238 and 240 is mounted in the end of each arm 232 and 234, respectively. A metal sleeve may be mounted in the end of each of the cushion arms 232 and 234 to provide an easily slidable connection to the pivot pins 238 and 240. The pins 238 and 240 are fixedly mounted within the internal structure of the seat back 22 and form co-axial pivot axes about which the entire cushion 230 can pivot.

The pivot connections provided by the pivot pins 238 and 240 on the arms 230 and 234 of the cushion 230 enable the cushion 230 to be pivoted from a first position, shown in solid in FIGS. 13 and 14 in which the cushion 230 is completely seated in the recess 224 in the seat back 222 thereby forming an integral part of the seat back 222. The cushion 230 can be easily pivoted by hand force from the retracted position shown in FIG. 13 to a first deployed position shown in phantom by reference number 242 in FIG. 13. Although this first deployed position 242 of the cushion 230 is shown as being substantially perpendicular to the seat back 22 or parallel to the seat bottom 224, it will be understood that the bottom edge of the recess 224 can be angled downward a greater amount to allow further pivoting movement of the cushion 230 below the horizontal to a more angled position relative to the seat back 232.

Alternately, an electric motor can be coupled to the side arms 232 or 234 and mounted in the seat back or seat bottom for automatically extending and retracting the cushion 230 through activation of a remotely located control switch.

In a modification to this design shown in FIGS. 13 and 14, a detent mechanism is mounted in the seat back 222 and the cushion 230 to provide discrete angular positioning of the cushion 230 in one of several distinct deployed positions. The detent mechanism includes a spring based pin 244 projecting from the seat back 222 into the recess 224. A cylindrical disc is mounted in each cushion arm end around the pivot pins 238 and 240 and carries a plurality of circumferentially spaced detent recesses labeled A, B, and C. When the cushion 230 is rotated so that the pin 244 engages detent recess A, the cushion 230 will be in the full retracted position within the recess 224. However, hand force on the cushion 230 can easily pull the cushion 230 from the recess 224 and rotate the cushion 230 until the pin 244 engages detent recess B. This defines the first angular deployed position of the cushion 230. Further downward force on the cushion 230 will cause the cushion 230 to rotate about the pivot pins 238 and 240 until the detent pin 244 engages the detent recess C to provide a lower angled deployed position C of the cushion 230.

Further, it is possible to connect extensible and retractable devices, such as electric motor driven linear rods or extensible and retractable fluid operated cylinders, to the pivot connections at the ends of the side arms 232 and 234 of the cushion 230. The extensible and retractable devices which are operated simultaneously from a vehicle occupant activated switch, similar to switches used to control the up and down movement of the vehicle windows, enable the entire cushion 230, after the cushion has been moved at least partially out of the recess in the seat back 232, to be elevated from the lowermost position shown in FIG. 13 to a more elevated or vertical spaced position so as to selectively position the entire cushion 230 at the desired height for the particular size occupant of the seat 220.

The extensible and retractable mechanisms are operated in a reverse manner to lower the pivot connections at each of the side arms 232 and 234 back to the lowermost position shown in FIG. 13 prior to pivotal movement of the cushion 230 in an upward direction into the recess in the seatback 232.

Referring now to FIGS. 15-18 there is depicted another aspect of a headrest 270. As with previous aspects of the present headrest, the headrest 270 includes a cushion 271 depicted has having a generally U-shape formed of a central end portion 272 which transitions into angularly disposed side cheek portions 274 and 276. The headrest 270 may alternately be in the form of a single side cheek which may have a linear shape, a slightly curved or arcuate shape, or a J-shape having a side cheek portion and a partial front end which may extend into close proximity or contact with the end of a mirror image J-shaped side check portion mounted in the seat back 220. A single J-shaped cushion may be employed all by itself on one lateral side of the seat back 220.

A recess 286 is formed in the seat back 220 opening from an open end at the front surface 232 of the seat back 220. The recess 286 has a depth suited for completely receiving the entire depth of the end portion 272 of the cushion 271 when the cushion 271 is in the fully retracted position.

Apertures 278 and 280 are formed on opposite sides of the back surface of the recess 286. The apertures 278 and 280 and open either into the interior of the seat back 220 or into the interior of receptacles 282 and 284, respectively, fixed within the interior of the seat back 220, generally within the cushion material, such as foam, for example, used to fill the interior of the seat back 220.

It will be understood that in a case of a headrest in the form of a single side cheek cushion, only one aperture 278 or 280 is formed in the seat back 220 adjacent either side edge of the seatback 232.

By way of example only, a slide mechanism is mounted in the seat back 220 in the form of one or multiple box members, with two box members 288 and 290 provided, by example, on each side of the headrest 270. The box members 288 may have any suitable cross-section, such as square, rectangular, circular, etc. Each box member 288 has a one or more first end flange 292 which extend laterally outward from the longitudinal center line of the box member 288 and opposed second flanges 294 which extend inward into the interior of the box member. The box member 288 has a hollow interior size for receiving the second box member 290 or, in the case of the use of only the single box member 288, the end of one of the side cushion portions 274 or 278 of the cushion 271. The box member 280 has a sidewall 296 which extends between the flanges 292 and 294.

The flanges 292 and 294 may comprise a pair of two laterally opposed flanges or a continuous or discontinuous series of multiple flanges in the case of a square cross-section box member 288 or 290. The function of the flanges 292 and 294 is to control the extension and retraction position of the box members 288 and 290 as described hereafter.

Figure 17:
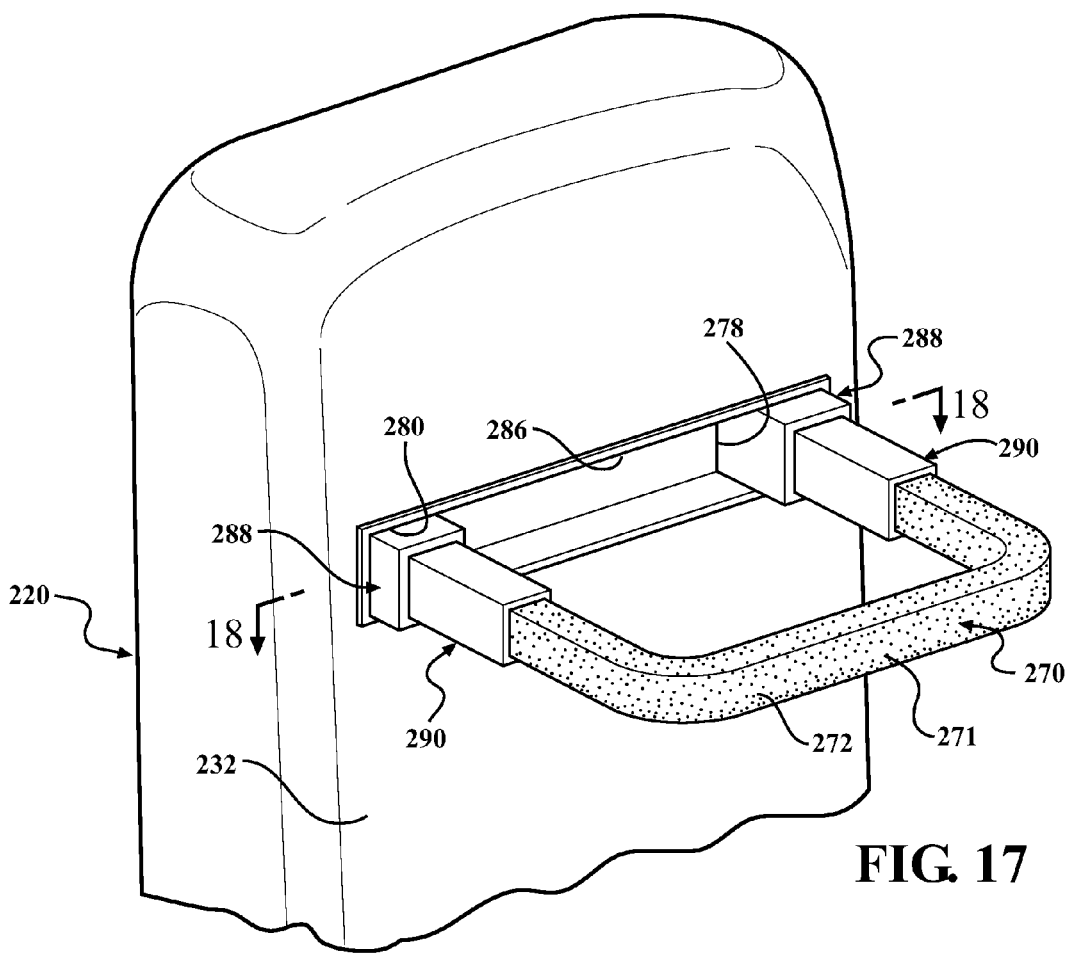
FIG. 17 is a perspective view of the headrest shown in FIG. 15 deployed in an extended, use position.
Figure 18:
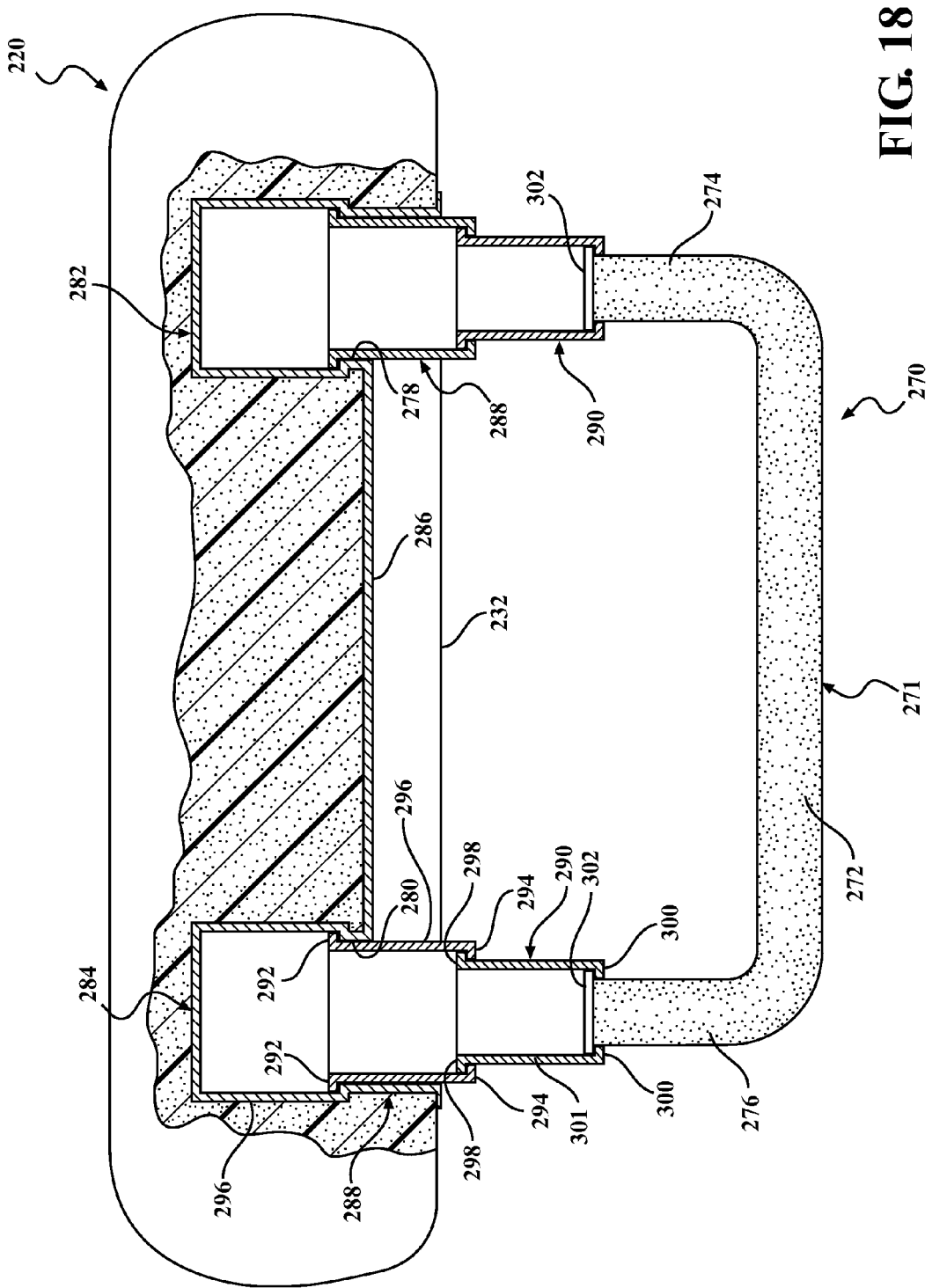
FIG. 18 is a cross-section view generally taken along line 18-18 and FIG. 17.

The second box member 290 has shape complimentary to the shape of the first box member 288, but with a smaller diameter or width dimension so that the flange or flanges 298 at a first end of the second box member 290 nest within the interior of the first box member 288 and are engageable with the second flanges 294 on the first box member 288 when the first and second box members 288 and 290 are pulled to their extended position as shown in FIGS. 17 and 18.

The second box member 290 includes a second flange or flanges 300 at an opposite end of a sidewall 301 which define an opening through which an enlarged end 302 of the side cushion 274 or 276 nests.

Figure 15:
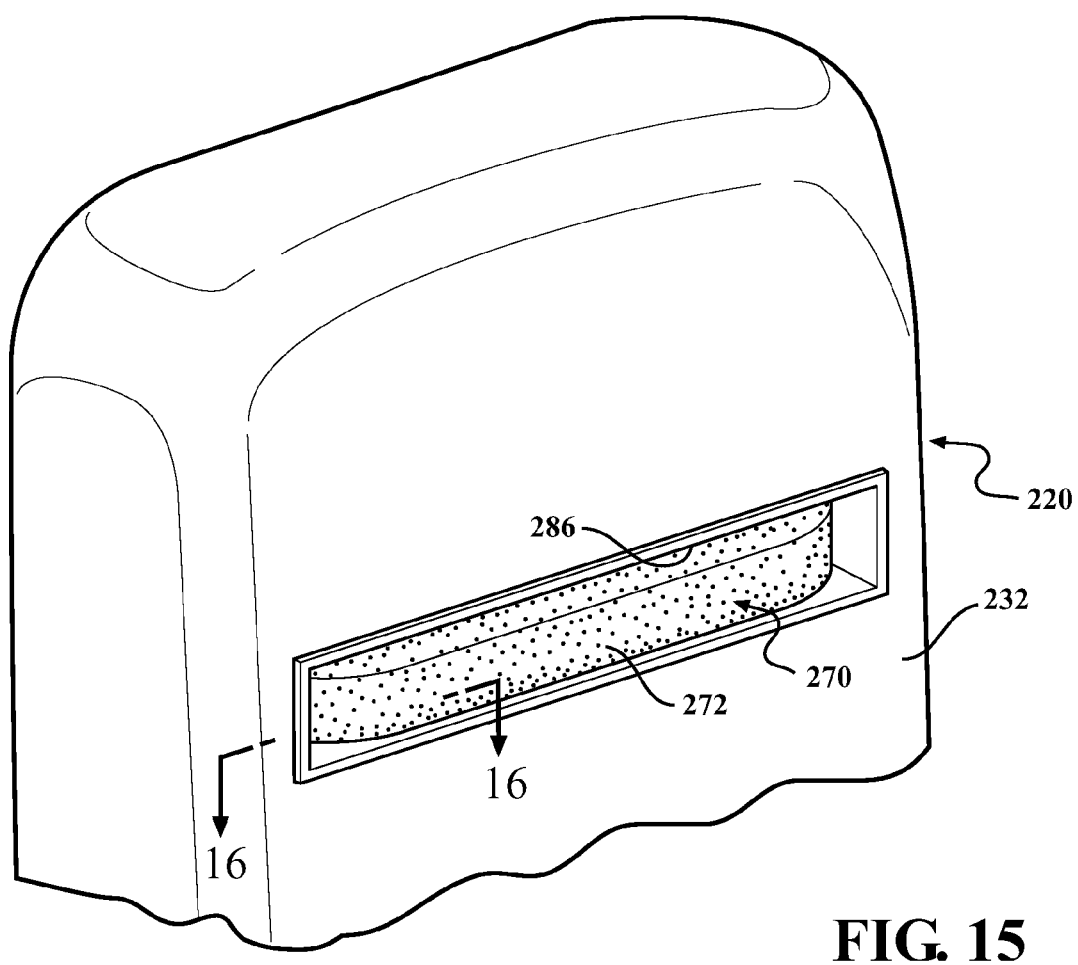
FIG. 15 is a perspective view of another aspect of a headrest depicted in a recessed, non-use position.

In use, the headrest 270 will assume to be in the retracted, non-use position shown in FIG. 15. In this position, the front end portion 272 of the cushion 271 fits substantially flush with the front surface 232 of the seatback 220 when the end portion 272 nests within the recess 286 opening from the front surface 232 of the seatback 220. This provides a substantially flush front surface 232 for the seat back 220 when the headrest 270 is not in use.

When use of the headrest 270 is desired, a user merely grasps the end portion 272 and pulls the end portion 272 outward away from the front surface 232 of the seat back 220. Although extension to the fully extended position shown in FIGS. 17 and 18 is the usual end position, it will be understood that the headrest 270 may be extended to any intermediate position to fit the size of the person seated in the seat.

Figure 16:
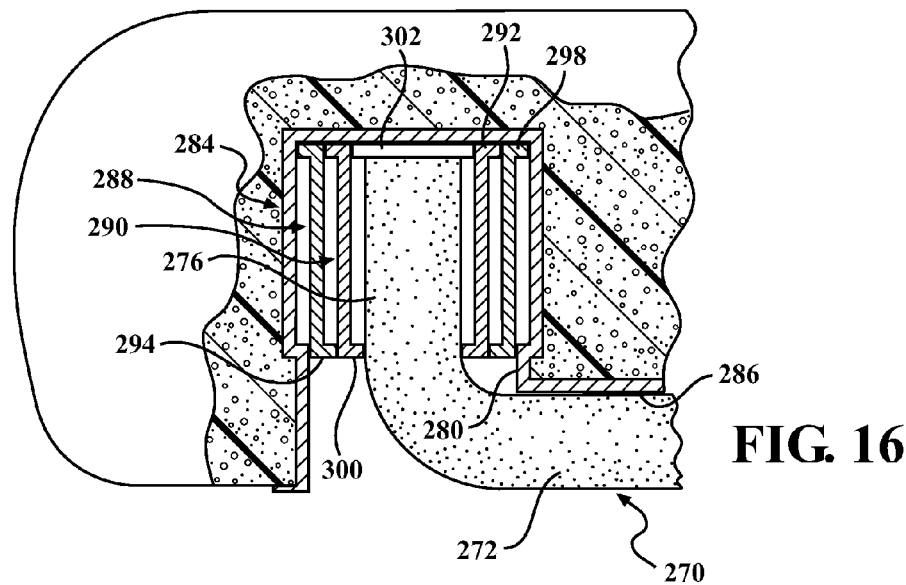
FIG. 16 is a cross-sectional view generally taken along line 16-16 in FIG. 15.

During the extension sliding motion, the flanges 292, 294, 298 and 300 of the box members 288 and 290 move from the nested position shown in FIG. 16. The initial outward force on the end portion 272 cause the side cushions 274 and 276 of the headrest 270 and their associated enlarged ends 302 to slide within the interior of the second box member 290 until the outer portions of the enlarged ends 302 engage the second flanges 300 on the second box member 290.

Continued outward force on the end portion 272 of the headrest 270 then causes the second box member 290 to slide through the interior of the first box member 288 from the nested, retracted position shown in FIG. 16 until the opposite end flanges 294 engage the second end flanges 298 of the first box 288. Continued extension movement then pulls the first box member 288 from the nested position shown in FIG. 16 to a fully extended position limited by engagement of the first end flanges 292 with a rigid plate or structure 310 formed within the seat back 220. This position, shown in FIGS. 17 and 18, defines the fully extended, use position of the headrest 270.

In the fully extended position shown in FIG. 17, the cushion 271 and the pairs of opposed box members 288 and 290 forms a opening in front of the front surface 232 of the seat back 270 suitable for receiving a least a portion of a user's head. The shape of the cushion 270 and the box members 288 and 290 surrounds the entire user's head so as to provide a cushion regardless of the position of the user's head.

When use of the headrest is no longer desired, the user simply exerts a pushing force on the end portion 272 of the cushion 271 which causes a reverse operation in which the ends 302 of the side cushions 274 and 276 slide through the interior of the second box member 290 until the laterally extending end portion 272 of the headrest 270 engages the flanges 300 on the second box member 290. This engagement and continued inward pushing force by the user, then causes the second box member 290 to move with the headrest 270 through the interior of the first box member 288 until the end portion 272 of the cushion 271 engages the second flanges 294 on the first box member 288. Continued inward pushing force then causes the first box member 288 to retract through the apertures 278 or 280 in the seatback 220. The inward pushing force is exerted on the headrest 270 until the front-end portion 272 nests completely within the recess 286.

Referring now to FIGS. 19-23, there is depicted another aspect of a headrest 330 which is extensibly mounted within the seat back 220

As in previous aspects, the headrest 330 is shown as being in the form of a continuous U-shaped member only by way of example as having cushion 36 with a portion 327 and two side portions 328 and 329. The headrest 330 may also be in the form of a single side cheek cushion of linear, slightly curved or J-shaped, or two side cushions of like, mirror image shape.

Figure 19:
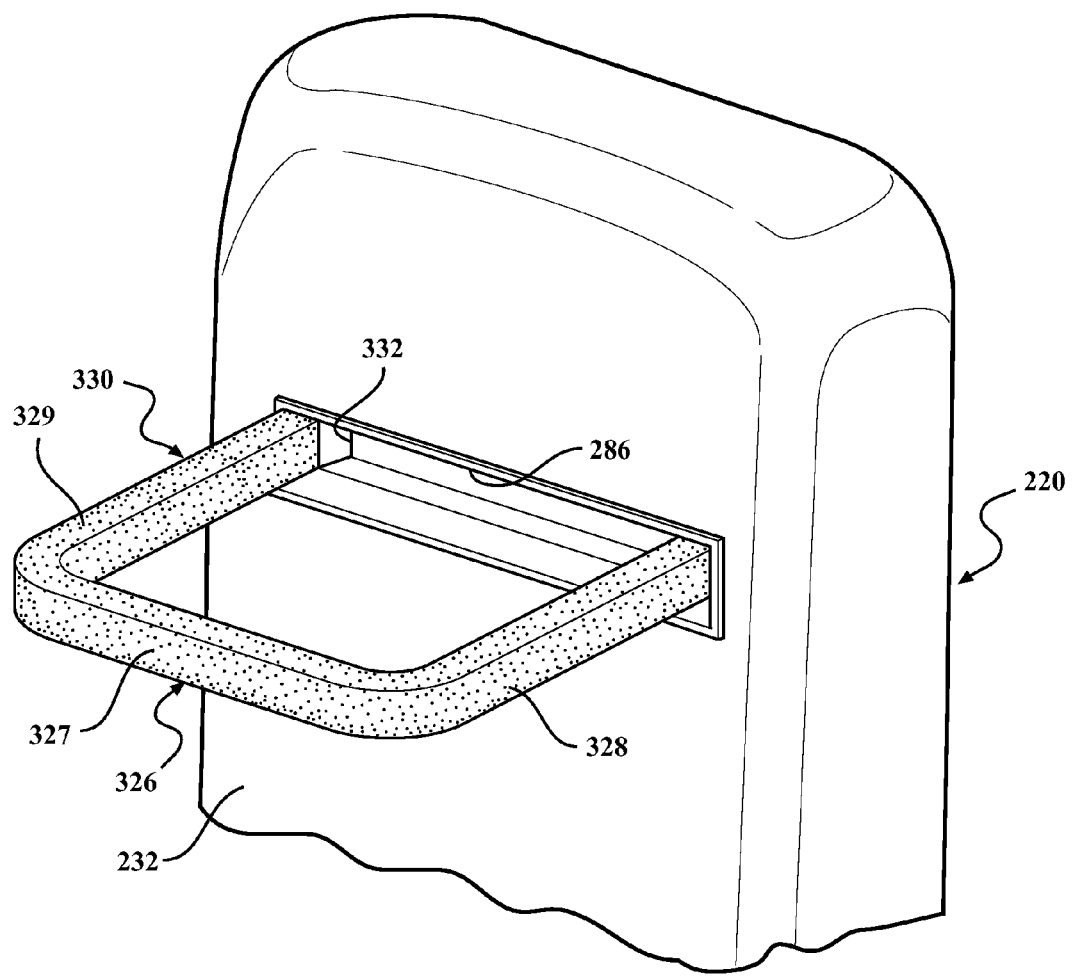
FIG. 19 is a perspective view showing another aspect of a headrest deployed in a partially extended use position.
Figure 20:
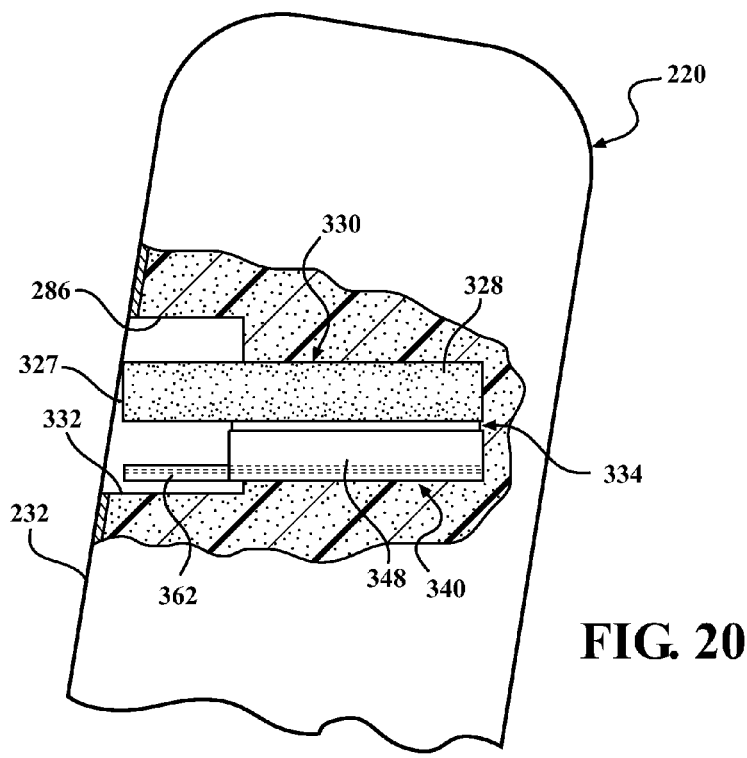
FIG. 20 is side cross-sectional view of the headrest shown in FIG. 19.

The seat back 220 has a configuration similar to that shown in FIGS. 15-18 and includes the recess 286 formed in the upper portion of the front surface 232 of the seat back 270. Opposed apertures 332, only one of which is shown in FIG. 19, are formed within the interior of the recess 286 and open to the interior of the seat back 220.

In this aspect, the headrest 330 extensibly and retractably moves on a slide mechanism denoted generally by reference number 340. The slide mechanism includes a lower track 342 and a slidably engaged upper slider 344 which is fixedly connected to and supports the end portion of the sides 328 and 329 of the cushion 326.

Figure 21:
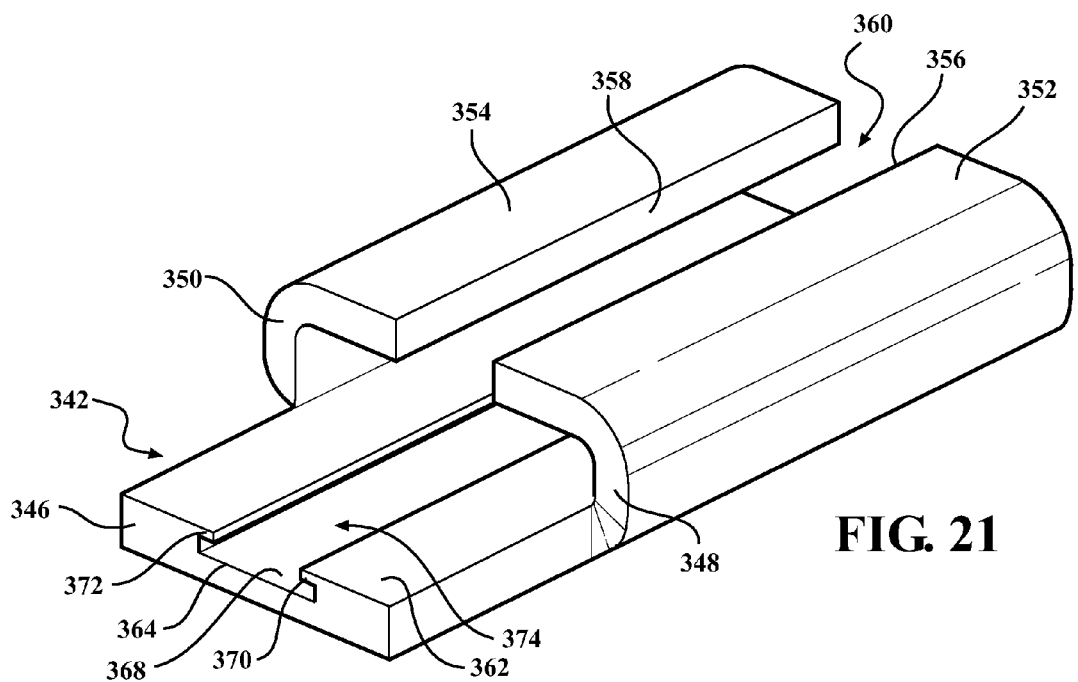
FIG. 21 is an enlarged, perspective view showing the lower track of the headrest depicted in FIG. 20.

As shown in detail in FIG. 21, the lower track 342, which may be formed of rigid, high strength plastic, metal or other suitable seat construction materials, has a bottom 346, a pair of opposed sides 348 and 350 and inward extending upper flanges 352 and 354 which are formed as an integral part or extension of the respective sides 348 and 350. The inner edges 356 and 358 of the upper flanges 352 and 354, respectively, are spaced apart to form a slot 360 which runs longitudinally along the entire length of the upper flanges 352 and 354.

The bottom 346 includes an extension 362 which projects from one end of the sides 348 and 350 and the inward extending flanges 352 and 354.

A recess 364 is formed substantially over the entire length of the bottom 346 of the lower track 342. The recess 364 is defined by a slot-like aperture 368 formed by upper inward extending flanges 370 and 372. The inner ends of the upper flanges 370 and 372 are spaced apart to define a slot 374 which runs along the length of the recess 364.

The upper slider 344 is slidably disposed within the interior of the sidewalls 348 and 350 and the inward extending flanges 352 and 354 of the lower track 342. A portion of the upper slider 380 projects through the slot 360 formed between the inner spaced edges 356 and 358 of the flanges 352 and 354.

Figure 22:
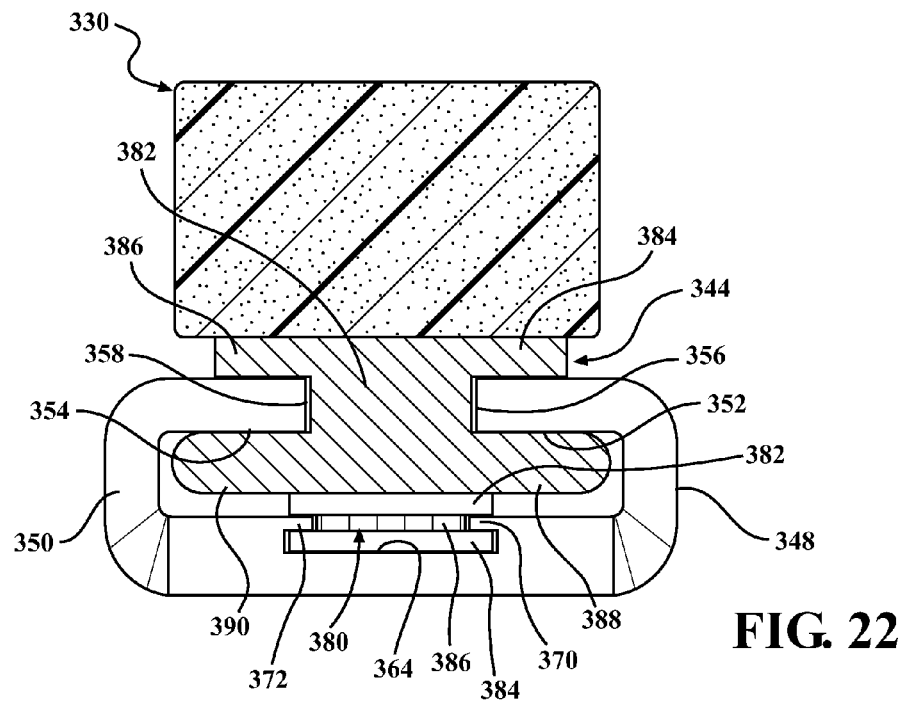
FIG. 22 is an end view of the slide mechanism for the headrest shown in FIG. 20.

As shown in FIG. 22, the upper slider 344 includes a central stem 382 from which projects a pair of longitudinally and oppositely extending upper flanges or lobes 384 and 386 and an opposed pair of longitudinally and oppositely or outwardly extending lower flanges or lobes 388 and 390. The lower flanges 388 and 390 slide within the opening extending above the bottom 346 and within the inner surface of the sides 348 and 350 and below the upper flanges 352 and 354 of the lower track 342 as shown in FIG. 22. A portion of the central stem 382 projects through the slot 360 formed between inner edges 356 and 358 of the upper flanges 352 and 354 to position the upper flanges 384 and 386 above the upper flanges 352 and 354 of the lower track 342.

The dimensions of the lower track 342 and the slider 344 are selected to provide a snug but freely movable fit. A friction fit maybe provided to enable the upper slider 344 to be pulled out any desired distance relative to the lower track 346 and remain in a relatively stable position.

When the headrest 330 in the fully retracted position, the front end portion of the headrest 330 will be substantially disposed within the recess 286 and substantially flush with the front surface 232 of the seatback 220.

To use the headrest 330, the user grasps the end portion 327 and pulls outward away from the seat back 220. This outward movement causes the upper slider 344 to slide along the lower track 342 until the headrest 330 reaches the fully extended position shown in FIG. 19. It will be understood that if a friction fit is employed between the upper slider 344 and the lower track 342, the headrest 330 may be disposed in any intermediate position between the full retracted position and the fully extended position.

An internal stop, not shown, may be coupled between the upper slider 344 and the lower track 342 to limit sliding movement of the upper slider 344 in a forward direction relative to the lower track 342 to prevent the headrest 330 from being pulled completely out of the slide mechanism 340.

A reverse operation using an inward pushing force causes the headrest 330 to move to the fully retracted position within the recess 286 in the seat back 220.

Figure 23:
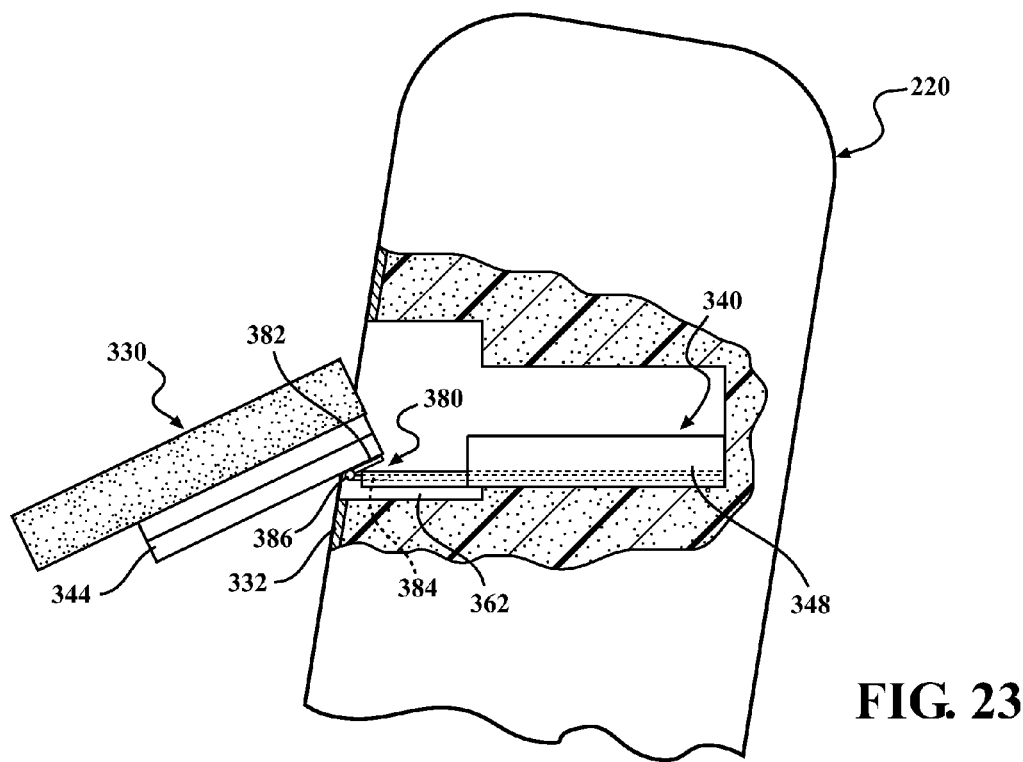
FIG. 23 is a side cross-sectional view showing another aspect of the headrest of FIG. 20 depicted in a deployed position.

FIGS. 21, 22 and 23 depict a modification to the slide mechanism 340 which enables a downward pivoting of the cushion 326 when the cushion 326 is in the fully extended position to accommodate shorter height users of the seat, such as small children.

The modification utilizes the recess 364 formed in the lower track 342 and a pivot member, such as a hinge 380, formed of a first hinge leaf 382 and a second hinge leaf 384 pivotally connected by a pivot pin 386. The first leaf 382 is fixedly connected to the bottom surface of the upper slider 344. The second hinge leaf 384 slides within the recess 364 and is captured within the recess 364 by the inward facing flanges 370 and 372 in the lower track 342.

In use, with the cushion 326 in the fully retracted position within the seat back 220, the first and second hinge leaves 382 and 384 will be in a collapsed position either in contact with each other or in non-contacting, but overlaying position. This allows normal sliding movement of the upper track 344 and the headrest 330 along the length of the lower track 342 between the retracted or extended positions.

After the headrest 330 has been pulled to the fully extended position, as shown in FIG. 22, a downward force can be exerted on the end 327 of the cushion 326. This downward force causes the hinge leaves 382 and 384 to separate, with the first hinge leaf 382 pivoting away from the second hinge leaf 384 which is held captured within the recess 364 in the lower track 342. This causes the entire headrest 330 to pivot about the hinge pin 386 bringing the front end portion 327 of the cushion 326 at a downward angle and at a lower position relative to the top edge of the seat back 220 to accommodate shorter height seat users, especially smaller children.

To retract the headrest 330, the headrest 330 is first pivoted upward bringing the upper slider 344 in line with the lower track 342. The upper slider 344 and the headrest 330 are then slid inward along the length of the lower track 342, as described above, until the fully retracted position is reached.

Figure 24:
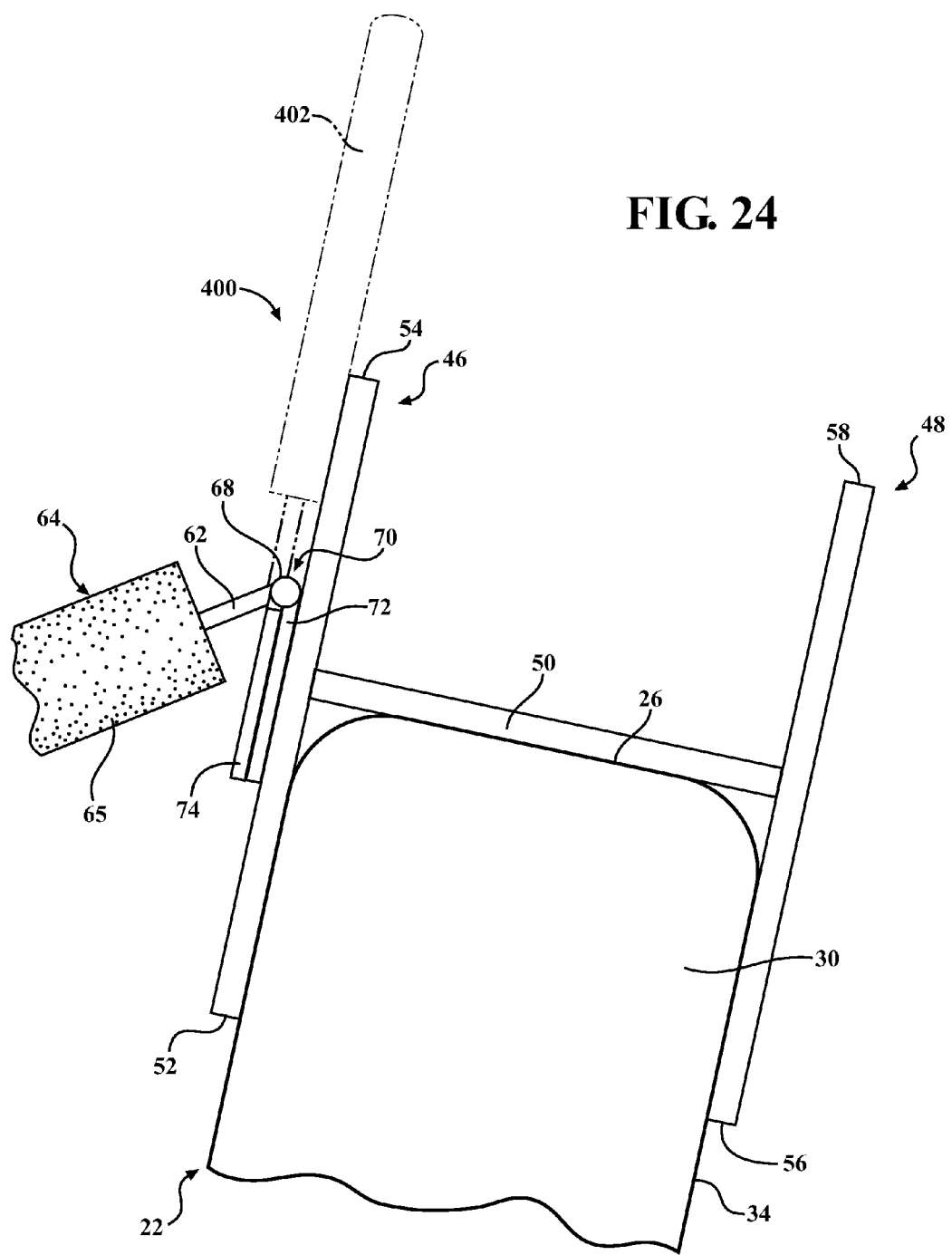
FIG. 24 is a side elevational view of another aspect of a headrest, showing a modification to the headrest depicted in FIG. 5.

Another aspect of a headrest 400 is shown in FIG. 24. The headrest 400 is similar to the headrest 40 shown in FIGS. 1-5. The headrest 400 can be constructed as a single, one piece headrest, including two pairs of mounting members 40 and 42 each of which includes a cross piece 44 spanning the top edge 26 of the seatback 30. The front mounting plates 46 of each pair of mounting plates 40 and 42 carry the hinges 70 with the first hinge leaf 72 fixed to the mounting plate 46 and the second hinge leaf 74 carrying the rod 62 attached to the cushion 64. As in the headrest 40, the pairs of mounting members 40 and 42 maybe separate with each carrying a single linear, curved or J-shaped cushion or a single cushion, such as cushion 64 may extend between the hinges on the front mounting plates of each pair of mounting plates 40 and 42.

As shown in FIG. 24, the hinge 70 is configured to allow pivotal movement of the cushion 64 from a first angular use position supporting the head, such as the side of the cheek, chin or forehead of a person seated within the seat to a second non-used position shown in phantom in FIG. 24 by reference number 402. The second position 402 places the cushion 64 in a substantially vertically extending position relative to the seatback 30. This allows easy ingress and egress of the person to and from the seat. Once the person is seated in the seat, the cushion 64 may be easily pivoted from the non-use position 402 to the first use position shown in solid in FIG. 24.

Figure 25:
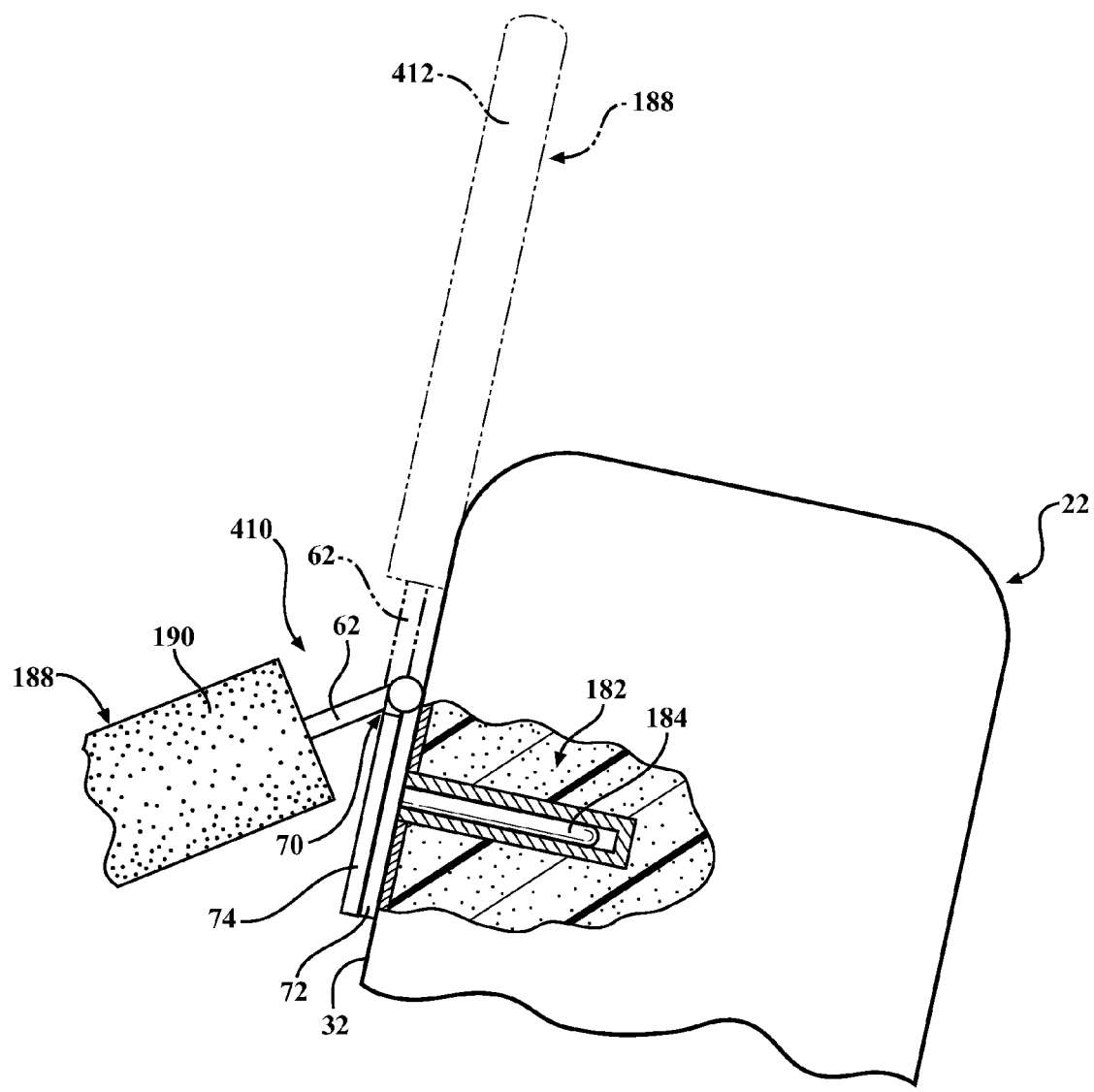
FIG. 25 is a side elevational view of another aspect of a headrest showing a modification to the headrest depicted in FIG. 11.

A similar hinged pivotal connection is provided for the headrest 410 shown in FIG. 25. The headrest 410 is similar to the headrest shown in FIGS. 9-11 in which the hinge 70 is connected to a rod which is insertable into a bore formed in the front surface 32 of the seat 22. In this headrest construction, the hinge 70 in a first use position in which the cushion 188 is angularly disposed with respect to the front surface 32 of the seatback 22 disposes the cushion 188. As in the headrest 400 shown in FIG. 24, the headrest 410 may also be configured as a single side headrest in which the cushion 188 has a linear, curved or J-shape for supporting only one side of a user's head or formed of two separate plug-in hinge assemblies, which are interconnected by a single U-shaped cushion 188.

In either construction, the hinge or hinges 70 allow the cushion 188 to be pivoted from the first use position shown in solid in FIG. 25 to a second non-use position 412 shown in phantom in FIG. 25. In the second non-use position 412, the cushion 188 is disposed at a substantially vertically extending orientation with respect to the front surface 32 of the seatback. This allows easy ingress and egress of a person to and from the seat. When the person is seated within the seat, the cushion 188 maybe pivoted from the second non-use position 412 back to the first use shown in solid in FIG. 25 to support a portion of the head the user.

Figure 26:
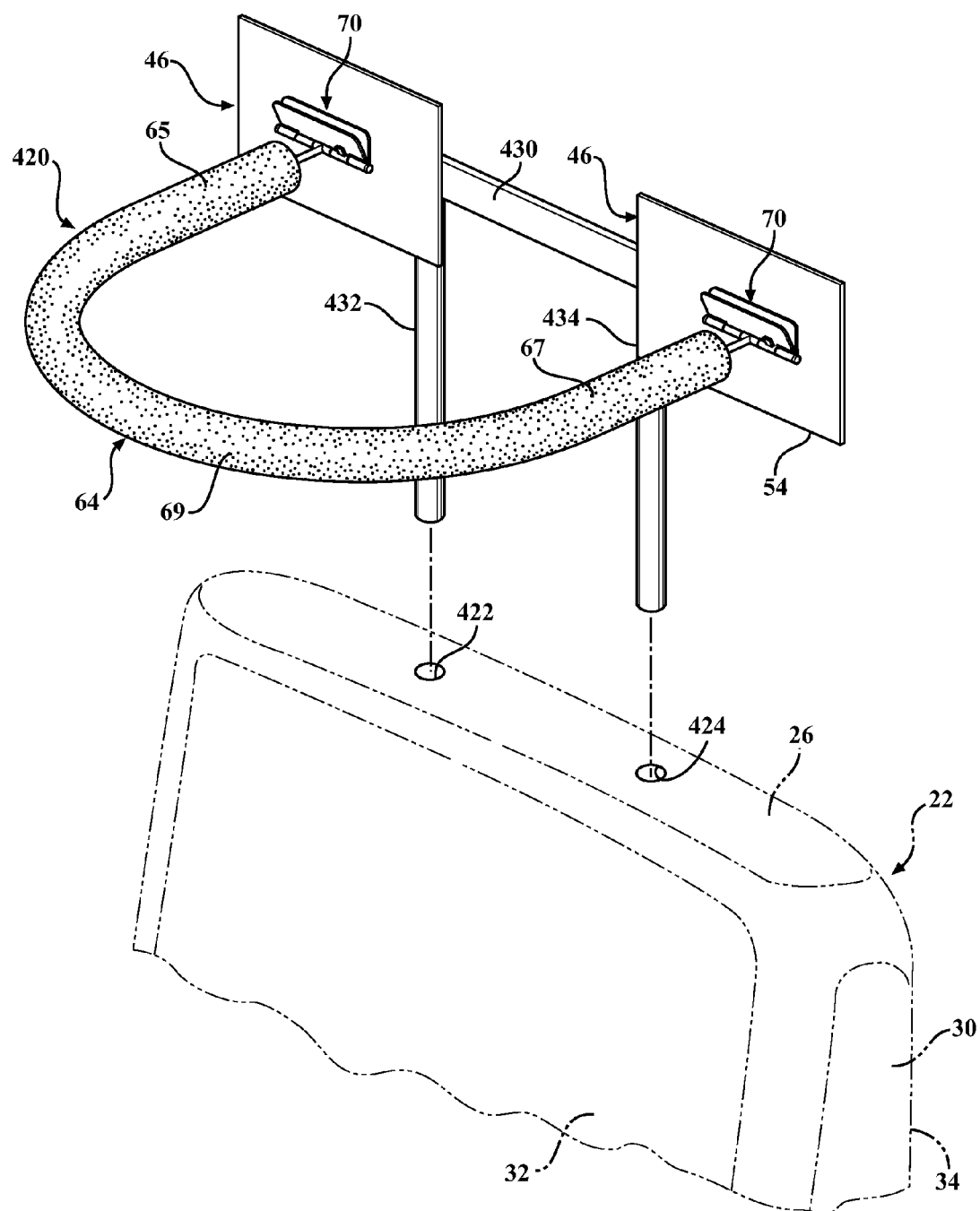
FIG. 26 is a perspective view of another aspect of a headrest.

Referring now to FIG. 26, there is depicted another aspect of a headrest 420 which mounts in the bores 422 and 424, extending inward into the seat 22 from the top edge 26 of the seatback 30. The bores 422 and 424 are normally used to receive the pair of posts on the standard seat headrest cushion which mounts on the top edge 26 of the seatback 22 for collision safety of the seat occupant. The headrest 420 is illustrated, by example only, as using the cushion 40 in the front plates 46 of the mounts 40 and 42 shown in FIGS. 1-5. It will be understood that the cushion 90 and 92 shown in FIG. 6 may also be employed with the single mounting plate 46 for one side support of a user's head.

The mounting plates 46 are fixedly secured together into an integral assembly by means of a cross member 430 which extends laterally between and is secured to each mounting plate 46 by suitable means, such as mechanical fasteners, adhesive, welding, etc.

Figure 6:
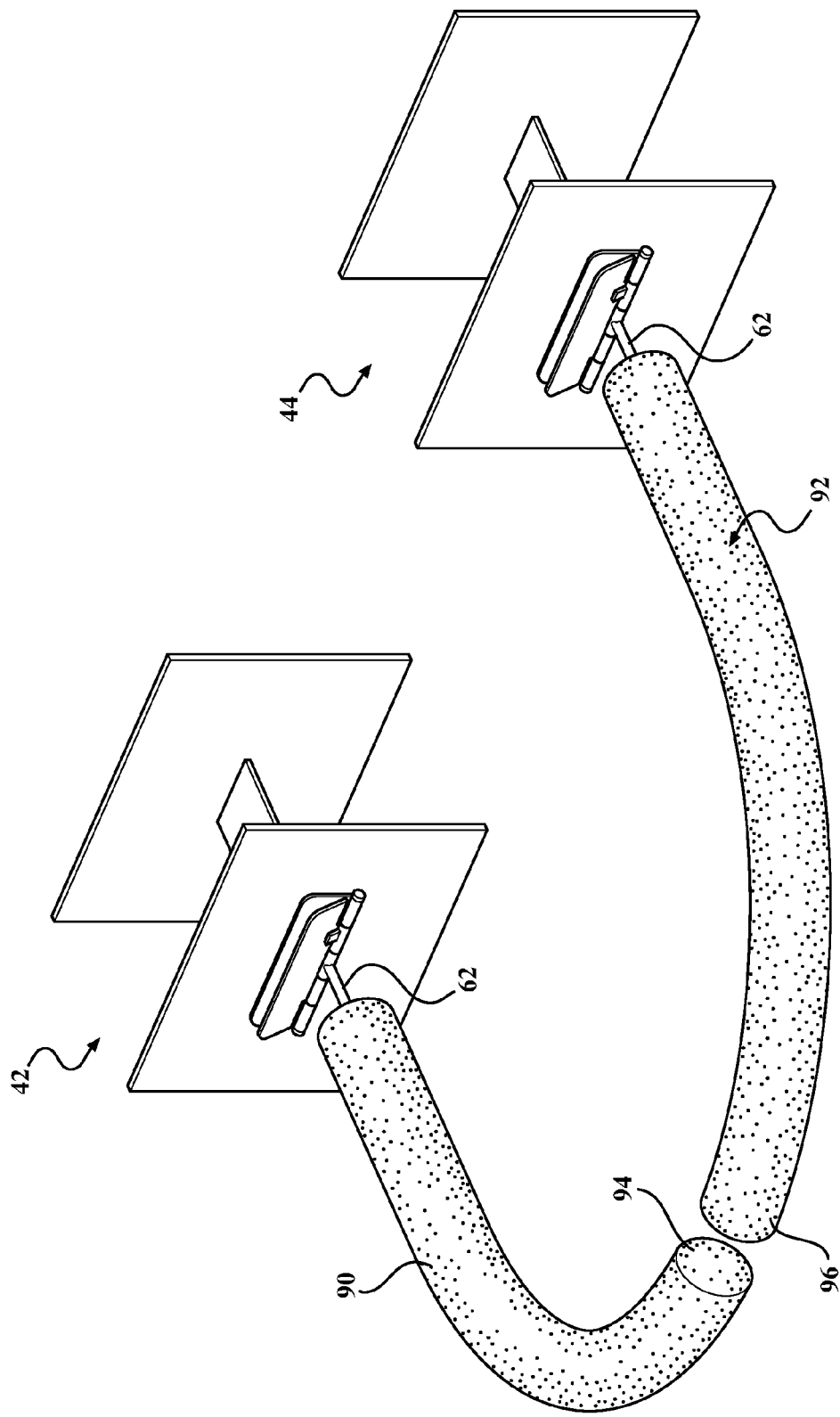
FIG. 6 is a modification of the headrest shown in FIG. 1.

A pair of posts 432 and 434 (with it being understood that only a single post 432 or 434 is used with a single side cushion, such as the cushion shown in FIG. 6), are fixed to and extend downward from the cross member 430. The post 432 and 434 are designed to fit into and removably slide into the bores 422 and 424 extending inward from an opening in the top surface 26 of the seatback 22. As mentioned above, the bores 422 and 424 are those used with the conventional seat headrest.

The cushion 64 can be secured to the mounting plates 46 in a permanent angular position, such as that shown in FIG. 26, which is depicted by way of example only, or other angular configurations, essentially at smaller acute angles with respect to the front surface 32 of the seatback 22. Alternately, the cushion 64 may be connected to the mounting plates 46 by a pivotal connection including the hinges 70 as described in previous aspects of the present headrest. The hinges 70 allow pivotal movement of the cushion 64 from the first use position shown in FIG. 26 to a non-use position, similar to the non-use positions of the cushions shown in FIGS. 24 and 25, in which the cushion 64 extends in a substantially vertical position relative to the front surface 32 of the seatback 22.

In use, the conventional seat headrest is removed and the post 432 and 434 of the headrest 420 inserted into the bores 422 and 424 of the seatback 22. The cushion 64 is moved to the desired first or second positions.

The headrest 420 can remain in position in the seatback 22 for as long as user desires to employ the headrest 420. When use of the headrest 420 is no longer desired, the entire headrest 420 can be removed from the seatback 24 in the standard seat headrest reinserted into the bores 422 and 424.

Referring now to FIGS. 27 and 28, there is depicted another aspect of a headrest 460. In this aspect, the headrest 460 has a shape substantially complimentary to the shape of the outer edge of a conventional vehicle seat head restraint 450.

The head restraint 450 typically includes an inner support 454 from which one or two posts 456 and 458 extend for removably insertion into the open ends 422 and 424 of sleeves or bores formed in the upper edge 26 of the seatback 22. A head restraint body 452 is formed about the head restraint pad 454 by foam, padding, etc., to fixedly attach the head restraint body 452 to the pad 454.

In the illustrated example of the head restraint 450, the head restraint body 452 has a smoothly curved, generally U-shaped outer edge. It will be understood that the outer edge of the head restraint body 452 may take other shapes, such as a rectangular shape, for example.

The cushion 460, which is formed in the same manner as the previously described cushions, has a shape substantially complimentary to the shape of the outer edge of the head restraint body 452, or a generally U-shape in the present example of the head restraint 450.

The cushion 460 includes a pair of opposed side legs 462 and 464 which extend from respective lower ends in a smoothly curved arc through an interconnecting central end portion 466. It will be understood that the lower end portions of the sides of the outer edge of the head restraint body 452 and the side legs 462 and 464 of the cushion 460 may have an initial straight portion extending from the lower ends before smoothly curving and transitioning into the arcuate central end portion 466.

In the present aspect, the cushion 460 is movably coupled to the head restraint body 452 for angular positioning between a first non-use position shown in FIG. 26 in which the cushion 460 substantially overlays the outer edge of the head restraint body 452 to any of a plurality of selected use positions, only one of which is shown in phantom in FIG. 27.

The pivotal action is provided by a pair of cushion connectors or pivots 470 and 472 located adjacent the lower ends of the side legs 462 and 464 of the cushion 460 and the lower ends of the opposed sides of the head restraint body 452.

One example of the pivot 470 is shown in FIG. 28. A pair of receivers or pin mounts 474 and 476 is respectively fixed in the head restraint body 452 and the side leg 462 of the cushion 460. The mounts 472 and 474 maybe adhesively or otherwise fixedly mounted in the cushion 460 of the head restraint 452.

A pivot pin 476 is mounted in co-axial bores formed in the mounts 472 and 474. The pin 476 maybe a solid pin or the pin 476 maybe formed of outwardly spring biased telescopingly coupled sections to enable the pin 476 to be compressed to a smaller length for mounting in the receivers 472 and 474 on opposite sides of the head restraint 450 and the cushion 460.

The cushion 460 can be angularly pivoted from the first position shown in solid in FIG. 28 to any desired stationary use position, such as the one shown in phantom in FIG. 27, by means of a tight friction fit between the lower inner portions of the side legs 462 and 464 of the cushion 460 and the adjoining portions of the outer edge of the head restraint body 452. Alternately, the mounts 472 and 474 and to the pivot pin 476 in the pivots 470 and 472 may be provided with a plurality of angularly spaced detents, as previously described, to provide one or more angularly spaced use positions for the cushion 460.

Figure 29:
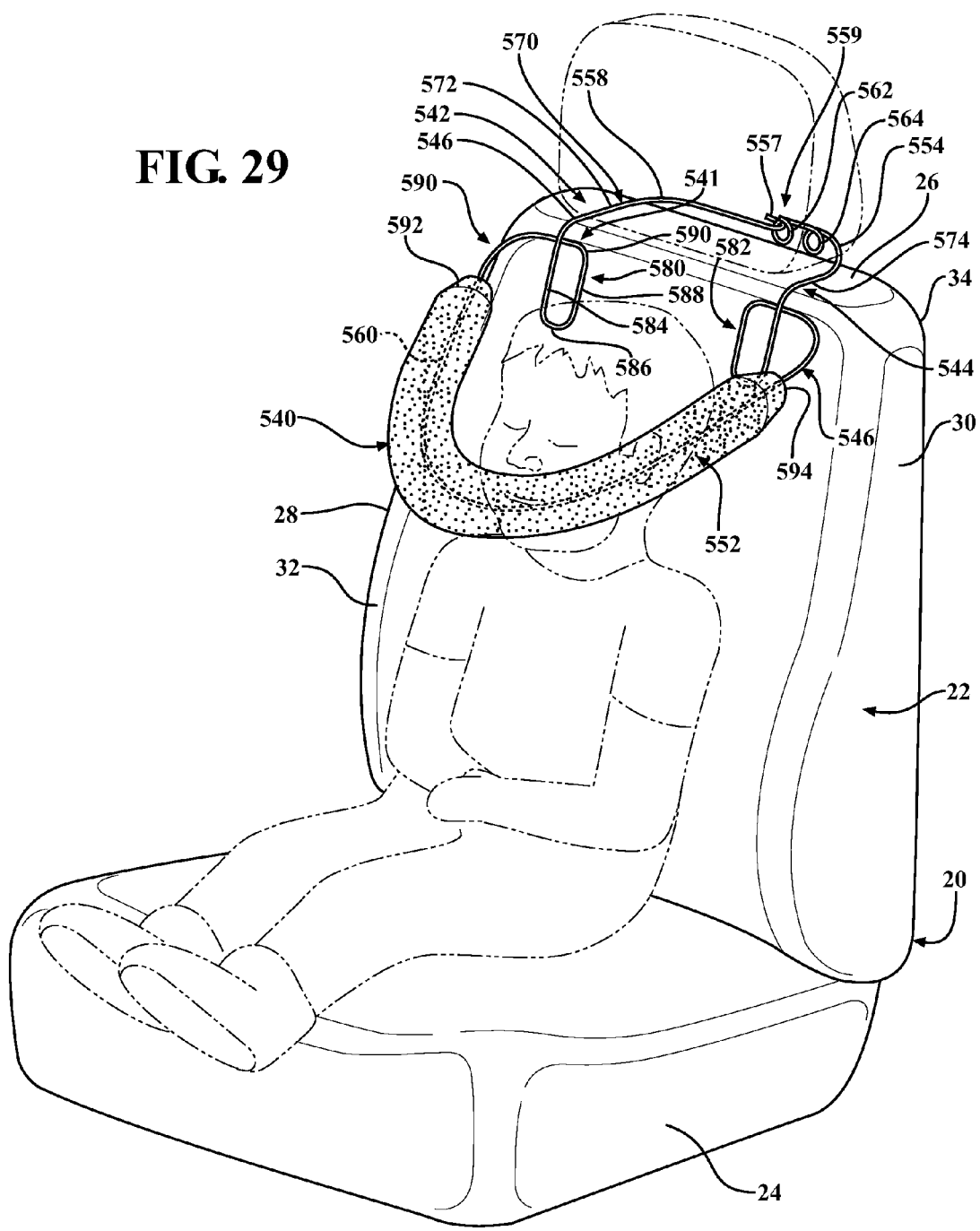
FIG. 29 is a perspective view of one aspect of a seat back headrest.
Figure 30:
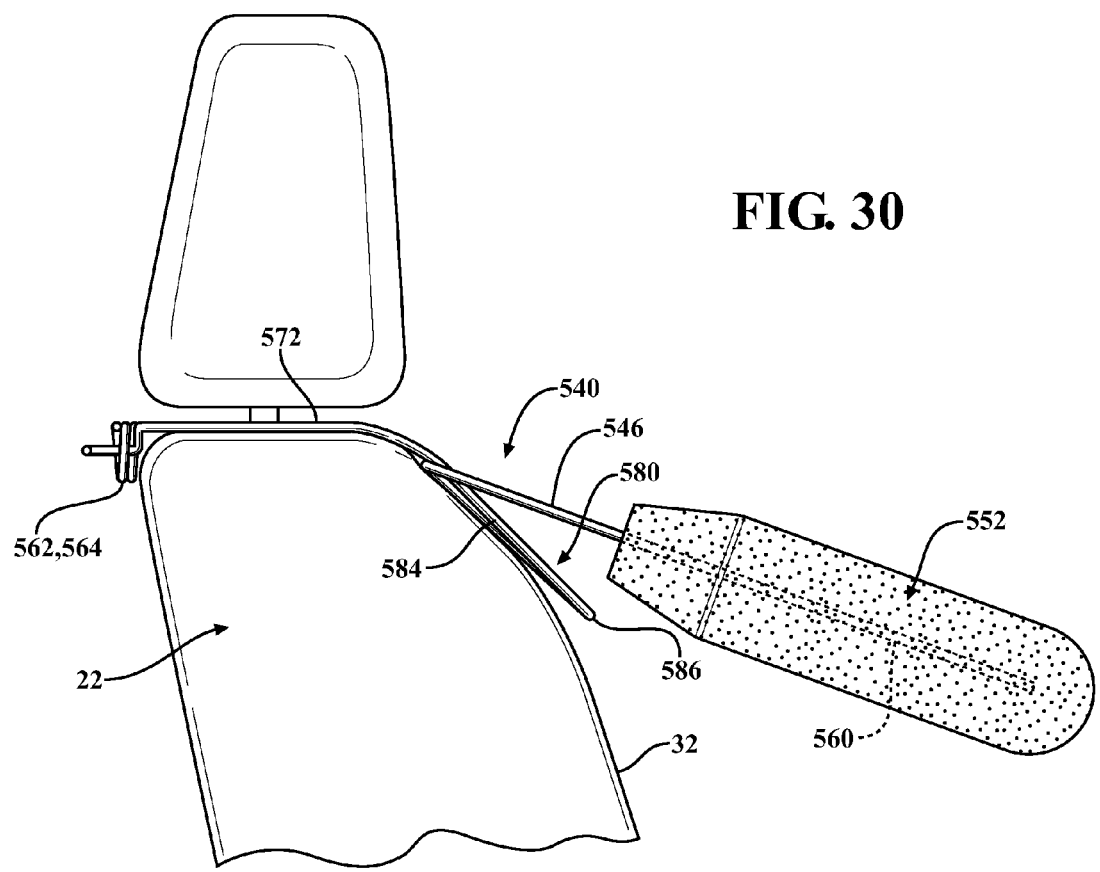
FIG. 30 is a side elevational view of the headrest shown in FIG. 29.

Referring now to the drawing and to FIGS. 29 and 30 in particular, there is depicted one aspect of a headrest 540 usable on a vehicle seat 20.

The headrest 540 includes a seat mount member 541 having a first seat mount member portion 542, a second seat mount member portion 544 and cushion connectors 546. The seat mount member portions 542 and 544 are substantially identical in that each includes a mounting leg portion 554 and a seat back engagement portion 580 and 582, respectively.

The first and second seat mount member portions 542 and 544 and the cushion connectors 546 are formed, by way of example only, as a continuous flexible rod 560. The rod 560 can be formed of a spring metal, with the portions of the rod 560 disposed exteriorly of the cushion 552 coated with a soft cover material, such as a soft plastic.

The rod 56 may also be formed of two separate portions, each including a seat back mounting member portion and a cushion connector portion. In this example, the cushion interconnects the cushion connectors on each of the separate rods.

The rod 560 is formed as a continuous member with freely movable end portions 558 and 559 which are formed with interconnecting means 562 and 564 in the form of an interlocking hook 557 formed as a U-shape in the end 558 of the rod 560 and at least one loop formed by bending the wire into a circular or other closed shape 562 adjacent the end 559. The hook 557 is insertable through the loop 562 to interlock and fixedly hold the ends 558 and 559 of the rod 560 securely about a seat headrest 570 or the upper surface 34 of the seat.

By way of example, at least one additional loop 564 is formed in the rod 560 adjacent to the loop 562 to provide for adjustability in securing the ends 558 and 559 of the rod 560 tightly about the seat headrest 570.

From the free ends 558 and 559 of the rod 560, the rod 560 is bent at an angle, typically approximately 90°, into legs 572 and 574 which are configured for engagement with a top edge 26 of the seat back 22. The legs 572 and 574 may be formed with a linear shape or a slightly arcuate, concave shape for secure engagement with the shape of the top edge 26 of the seat back 22.

The legs 572 and 574 transition into the seat back engagement portions or pads 580 and 582 which, by example only, are in the form of enlarged pads 580 and 582. Each of the pads 580 and 582 has a first leg 584 angularly disposed relative to the leg 572 or 574. The first leg 584 may be disposed at an obtuse or greater than 90° angle relative to the corresponding leg 572 or 574 to orient the cushion connectors and the cushion at the desired forward facing angle relative to the front surface 32 of the seat back 22, as described hereafter.

The first leg 584 transitions into a first end leg 586, then a second leg 588 spaced from the first leg 584 and then a second end leg 590 spaced from the first end leg 586. The legs 584, 586, 588 and 590 may be formed into the illustrated rectangular shape, or any other shape, such as circular, or polygonal to form an enlarged pad-like surface area for secure engagement with the seat back 22 to securely support the headrest 540 on the seat back 22.

The opposite ends of the second legs 590 of each of the pads 580 and 582 again curve outward from the pads 580 and 582 into the cushion connectors 546 which project out of the opposite ends 592 and 594 of the cushion 560.

As shown in FIG. 30, the pads 580 and 582 project at an angle from the mounting member legs 572 so as to dispose the cushion connectors 546 and the attached cushion 560 in a forward facing direction relative to the front surface 32 of the seatback 22 so that the cushion 552 encircles the upper portion of a user's head seated in the seat. For use of headrest 540 with smaller children, it is possible to bend the rod 560 at the juncture of the pads 580 and 582 and the mounting legs 572 and 574 so that the angle of the pads 580 and 582 relative to the legs 572 and 574 is at a smaller obtuse angle. This has the effect of changing the angle of the cushion connector 546 and the attached cushion 552 so that the cushion 552 is disposed at a smaller acute angle relative to the front surface 32 of the seatback 22.

Alternately, the angle of the cushion connectors 546 relative to the loop 580 and 582 may also be changed by bending the rod 560 at the juncture of each cushion connector 546 and the respective pad 580 and 582 in a direction to decrease the angle between the pads 580 and 582 and the cushion connector 546. This has the same effect as the alternate bending location described above to decrease the angle of the cushion 552 relative to the front surface 32 of the seatback 22 for use with shorter children.

By example, the second leg 590 of each of the pads 580 and 582 is disposed under the first leg 584 of each pad 580 or 582. This provides additional support for the entire headrest 540 when mounted on the seat back 22 as well as a measure of flexibility for the cushion 560 to conform to the position of the user's head when the user's head engages the cushion 560, such as when the user is asleep. However, the above-described overlap of the legs of the pads 580 and 582 enables the first legs 582 of each loop 580 and 582 to retain the adjacent cushion connector 546 in a relatively stable position when the headrest 540 is mounted on the seat back 22.

As shown in FIGS. 29 and 30, the rod 560 extends continuously through the cushion 552. This enables the cushion 552 to be molded or otherwise formed by vacuum forming, for example, from a self-skinning plastic resin or plastic material, about the cushion-supporting portion of the rod 560 in a mold to form the cushion in the desired generally tubular, cross-section shape illustrated by way of example only in FIGS. 29 and 30.

In use, with the hook 557 disengaged from the loops 562 or 564; the headrest 540 is mounted over the upper edge 26 of a seat back 22 until the legs 572 and 574 lay in contact with the top edge 26 of the seat back 22. In this position, the enlarged pads 580 and 582 are disposed in contact with the upper portion of the front surface 32 of the seat back 22 and the cushion 560 is disposed forward of and at a slightly downward extending angle relative to the pads 580 and 582. The hook 557 is then engaged with an appropriate one of the loops 562 and 564 to tightly secure the free ends 558 and 559 of the rod 560 about the car seat headrest 570 or about the upper portion of the seat back 22.

It should be noted that the headrest 540 can be installed prior to the user entering the seat 20 or after the user is seated in the seat 20.

Figure 32:
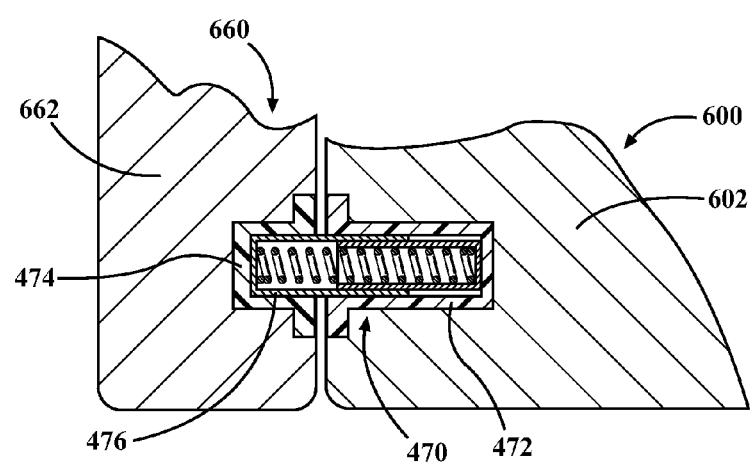
FIG. 32 is a cross-sectional view generally taken along line 32-32 in FIG. 31.
Figure 31:
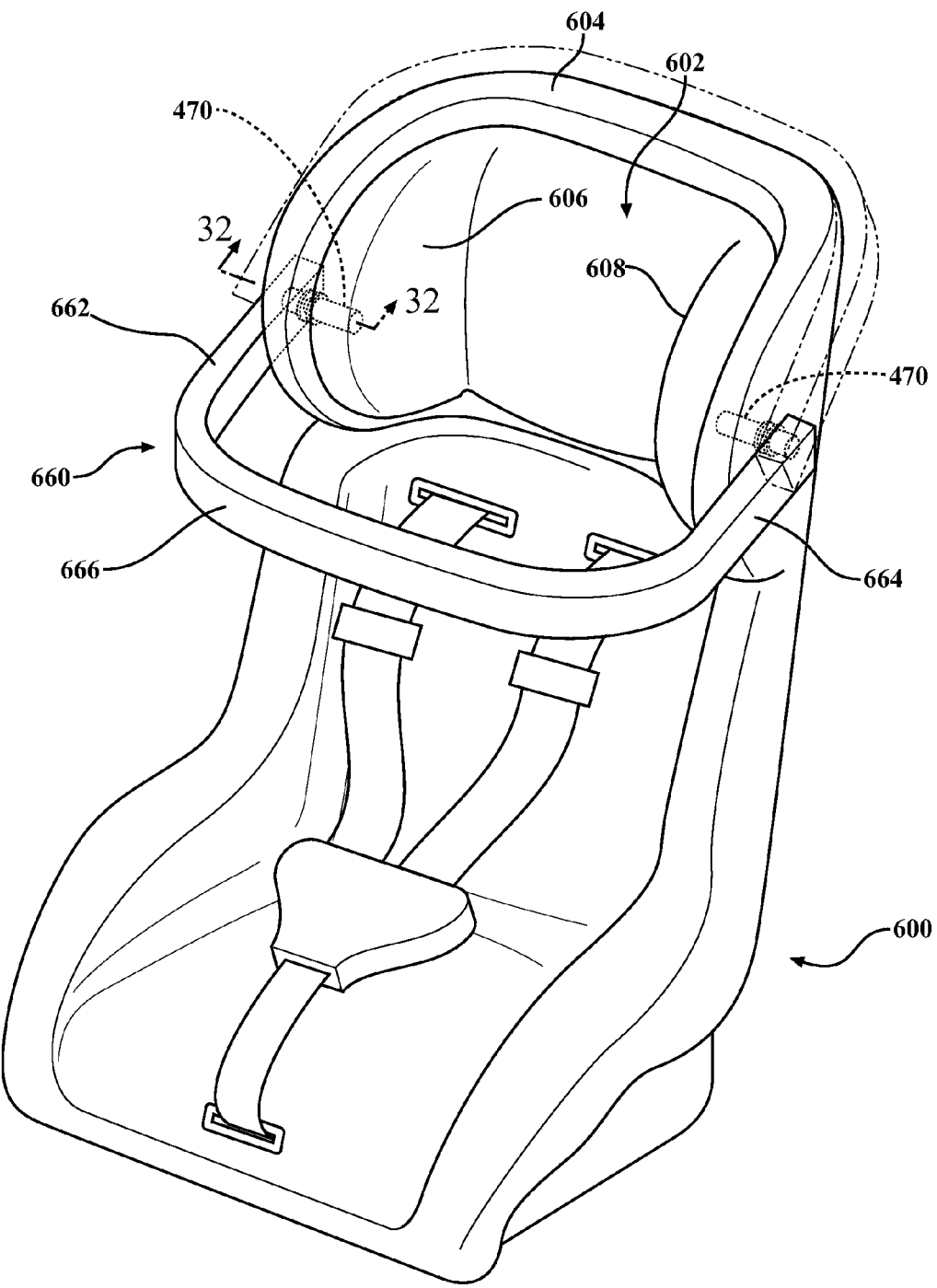
FIG. 31 is a perspective view of another aspect of a headrest integrally mounted on a child car seat or child booster car seat.

Referring now to FIGS. 31 and 32, there is depicted another aspect of a headrest 660. In this aspect, the headrest 660 has a shape substantially complimentary to the shape of the outer edge of a conventional child car seat or child car booster seat 600.

The child car seat 600 typically includes a head support area 602 from which two side wings 606 and 608 extend. The upper edge of each side wing 606 and 608 or the entire rear surface of the child car seat 600 may be formed of a rigid material, such as a hard plastic. An upper or top edge 604 is formed in the back of the child car seat 600 between the upper ends of the side wings 606 and 608. Portions or the entire inner surface of the child car seat 600 may be covered with a soft, resilient pad for child comfort.

By way of example only, the upper edge of the side wings 606 and 608 or the outer shell of the child car seat 600 which provides support for the side pads, and the top edge 604 of the back of the child seat 600 form a generally U-shaped continuous outer edge. It will be understood that the outer edge of the child seat 600 may take other shapes, such as any polygonal shape, for example.

The cushion 666, which is formed in the same manner as the previously described cushions, has a shape substantially complimentary to the shape of the outer edge of the child car seat 600, or a generally U-shape in the present example of the child car seat 600.

The cushion 660 includes a pair of opposed side legs 662 and 664 which extend from respective free ends in a smoothly curved arc through an interconnecting central end portion 666. It will be understood that the lower end portions of the sides of the outer edge of the child seat 600 and the side legs 662 and 664 of the cushion 660 may have an initial straight portion extending from the ends before smoothly curving and transitioning into the arcuate central end portion 666.

In this aspect, the cushion 660 is movably coupled to the child seat 600 for angular positioning between a first non-use position shown phantom in FIG. 31 in which the cushion 660 substantially overlays or fits within the outer top edge of the child seat 600 and at least one or a plurality of selected use positions, only one of which is shown in solid in FIG. 31.

The pivotal action of the cushion 660 is provided by a pair of cushion connectors or pivots 470 and 472 located adjacent the lower ends of the side legs 662 and 664 of the cushion 660 and the opposed sides of the child car seat 600.

One example of the pivot 470 is shown in FIG. 32. A pair of receivers or pin mounts 474 and 476 is respectively fixed in the child car seat 600 and the side leg 662 of the cushion 660. The mounts 472 and 474 maybe adhesively or otherwise fixedly mounted in the cushion 660 and the child car seat 600.

A pivot pin 476 is mounted in co-axial bores formed in the mounts 472 and 474. The pin 476 maybe a solid pin or the pin 476 maybe formed of outwardly spring biased telescopingly coupled sections to enable the pin 476 to be compressed to a smaller length for mounting in the receivers 472 and 474 on opposite sides of the child car seat 600 and the cushion 660.

The cushion 660 can be angularly pivoted from the first position, shown in phantom in FIG. 31, to any desired stationary use position, such as the one shown in solid in FIG. 31, by means of a tight friction fit between the lower inner portions of the side legs 662 and 664 of the cushion 660 and the adjoining portions of the outer edge of the child car seat 600. Alternately, the mounts 472 and 474 to the pivot pin 476 in the pivots 470 and 472 may be provided with a plurality of angularly spaced detents to provide one or more angularly spaced, discrete use positions for the cushion 660.

In use, the cushion or headrest 660 is pivoted to the first non-use position overlaying the rear portion of the top edge of the child seat 600. After the child is inserted into the child car seat 600, the headrest 660 is pivoted about the pivots 470 and 472 to the desired angular position where the cushion 660 is situated forward of and encircling the child's face. This positions the cushion 660 for engagement with and to support a portion of the child's head, such as the forehead and/or side or cheek portion of the child's head, when the child's head slumps forward during sleep.

What is claimed is:

1. In combination, a vehicle seat having a generally upright seatback with an upper end, opposed side edges, a front surface and back surfaces, and a headrest, the combination comprising:
two generally horizontally spaced bores formed in the seat back, each extending from an open end at the front surface of the seat back;
   a portable headrest having a pair of connectors mountable in the bores in the seat back;
   a single cushion carried by the pair of connectors for weight bearing support of a seat user's head;
   a hinge having first and second pivotally connected hinge portions, the first hinge portion fixedly coupled to the connector; and
   the second hinge portion coupled to the cushion and pivotally movable from a first position relative to the first hinge member when the head rest is in a first position on the seat back and a second position relative to the first hinge portion when the head rest is in the inverted second position to deploy the cushion in one of two angular positions relative to the seat back.

2. In combination, a vehicle seat having a generally upright seatback with an upper end, opposed side edges, a front surface and back surfaces, and a headrest, the combination comprising:
   at least one first bore extending substantially horizontally into the seat back from an open end at the front surface of the seat back;
   a portable headrest having a connector mountable in the at least one first bore in the seat back;
   a cushion carried by the connector for weight bearing support of a seat user's head;
   at least one second bore disposed at a downward extending angle relative to the first bore in the seat back and adapted to receive the connector for disposing the cushion at a downward extending acute angle relative to the seat back.

3. The combination of claim 2 wherein:
   the connector is releasibly mountable in one of the at least one first bore and the at least one second bore in the seat back.

4. The combination of claim 2 further comprising:
   the at least one first bore and the at least one second bore each terminating at a closed end within an interior of the seat back.

* * * * *